US011256983B2

(12) United States Patent
Ogale et al.

(10) Patent No.: US 11,256,983 B2
(45) Date of Patent: Feb. 22, 2022

(54) NEURAL NETWORKS FOR VEHICLE TRAJECTORY PLANNING

(71) Applicant: Waymo LLC, Mountain View, CA (US)

(72) Inventors: Abhijit Ogale, Sunnyvale, CA (US); Mayank Bansal, Mountain View, CA (US); Alexander Krizhevsky, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 892 days.

(21) Appl. No.: 15/662,031

(22) Filed: Jul. 27, 2017

(65) Prior Publication Data

US 2019/0034794 A1 Jan. 31, 2019

(51) Int. Cl.
*G06N 3/08* (2006.01)
*G05D 1/02* (2020.01)
(Continued)

(52) U.S. Cl.
CPC .......... *G06N 3/08* (2013.01); *G01C 21/3407* (2013.01); *G01S 17/931* (2020.01);
(Continued)

(58) Field of Classification Search
CPC ........ G06N 3/08; G06N 3/008; G06N 3/0445; G06N 3/0454; G06N 3/084; G01S 17/931;
(Continued)

(56) References Cited

U.S. PATENT DOCUMENTS 9,663,111 B2 5/2017 Kristinsson et al.
9,989,964 B2 * 6/2018 Berntorp ................ G06N 3/049
(Continued)

FOREIGN PATENT DOCUMENTS

WO WO 2016/156236 10/2016

OTHER PUBLICATIONS

Jiajia Chen, Pan Zhao, Huawei Liang, and Tao Mei, "Motion Planning for Autonomous Vehicle Based on Radial Basis Function Neural Network in Unstructured Environment", Sep. 18, 2014, Sensors 2014, 14, pp. 17548-17566. (Year: 2014).*

(Continued)

*Primary Examiner* — Kamran Afshar
*Assistant Examiner* — Ying Yu Chen
(74) *Attorney, Agent, or Firm* — Fish & Richardson P.C.

(57) ABSTRACT

Systems, methods, devices, and other techniques for training a trajectory planning neural network system to determine waypoints for trajectories of vehicles. A neural network training system can train the trajectory planning neural network system on the multiple training data sets. Each training data set can include: (i) a first training input that characterizes a set of waypoints that represent respective locations of a vehicle at each of a series of first time steps, (ii) a second training input that characterizes at least one of (a) environmental data that represents a current state of an environment of the vehicle or (b) navigation data that represents a planned navigation route for the vehicle, and (iii) a target output characterizing a waypoint that represents a target location of the vehicle at a second time step that follows the series of first time steps.

20 Claims, 8 Drawing Sheets

(51) Int. Cl.
    G06N 3/04      (2006.01)
    G06N 3/00      (2006.01)
    G01C 21/34     (2006.01)
    G01S 17/931    (2020.01)
    G01S 17/42     (2006.01)
    G01S 13/86     (2006.01)
    G01S 17/86     (2020.01)
    G01S 13/931    (2020.01)
(52) U.S. Cl.
    CPC ......... *G05D 1/0212* (2013.01); *G05D 1/0221* (2013.01); *G06N 3/008* (2013.01); *G06N 3/0445* (2013.01); *G06N 3/0454* (2013.01); *G06N 3/084* (2013.01); *G01S 13/865* (2013.01); *G01S 13/867* (2013.01); *G01S 17/42* (2013.01); *G01S 17/86* (2020.01); *G01S 2013/9323* (2020.01); *G05D 2201/0213* (2013.01)
(58) Field of Classification Search
    CPC . G01C 21/3407; G05D 1/0212; G05D 1/0221
    See application file for complete search history.

(56) References Cited

U.S. PATENT DOCUMENTS

| | | | |
|---|---|---|---|
| 10,268,191 B1 * | 4/2019 | Lockwood | G05D 1/0027 |
| 2016/0325753 A1 | 11/2016 | Stein et al. | |
| 2020/0174490 A1 | 6/2020 | Ogale et al. | |

OTHER PUBLICATIONS

Kyle D. Julian and Mykel J. Kochenderfer, "Neural Network Guidance for UAVs", Jan. 2017, AIAA Guidance, Navigation, and Control Conference, pp. 1-14. (Year: 2017).*
Samyeul Noh, Byungjae Park, Kyounghwan An, Yongbon Koo, and Wooyong Han, "Co-Pilot Agent for Vehicle/Driver Cooperative and Autonomous Driving", Oct. 2015, ETRI Journal, vol. 37, No. 5, pp. 1032-1043. (Year: 2015).*
Amit Chaulwar, Michael Botsch, and Wolfgang Utschick, "A Machine Learning Based Biased-Sampling Approach for Planning Safe Trajectories in Complex, Dynamic Traffic-Scenarios", Jun. 2017, 2017 IEEE Intelligent Vehicles Symposium (IV), pp. 297-303. (Year: 2017).*
Georges S. Aoude, Vishnu R. Desaraju, Lauren H. Stephens, and Jonathan P. How, "Driver Behavior Classification at Intersections and Validation on Large Naturalistic Data Set", 2012, IEEE Transactions on Intelligent Transportation Systems, vol. 13, No. 2, pp. 724-736. (Year: 2012).*
Bansal et al. "ChauffeurNet: Learning to Drive by Imitating the Best and Synthesizing the Worst," arXiv 1812.03079v1, Dec. 7, 2018, 20 pages.
Bojarski et al. "Explaining how a deep neural network trained with end-to-end learning steers a car," arXiv 1704.07911v1, Apr. 25, 2017, 8 pages.
Chen et al. "Deep Driving: Learning Affordance for Direct Perception in Autonomous Driving," Proceedings of the IEEE International Conference on Computer Vision, Dec. 2015, 9 pages.
Codevilla et al. "End-to-end driving via conditional imitation learning," IEEE International Conference on Robotics and Automation, May 21, 2018, 8 pages.
Djuric et al. Short-term motion prediction of traffic actors for autonomous driving using deep convolutional networks, arXiv 1808.05819v2, Sep. 16, 2018, 7 pages.
Dosovitskiy et al. "CARLA: An open urban driving simulator," arXiv 1711.03938v1, Nov. 10, 2017, 16 pages.
Fairfield et al. "Traffic Light mapping and detection," IEEE International Conference on Robotics and Automation, May 9, 2011, 6 pages.

Hecker et al. "Learning driving models with a surround-view camera system and a route planner," arXiv 1803.10158v1, Mar. 27, 2018, 21 pages.
Kuefler et al. "Imitating driver behavior with generative adversarial networks," arXiv 1701.06699v1, Jan. 24, 2017, 8 pages.
Laskey et al. "Comparing human-centric and robot-centric sampling for robot deep learning from demonstrations," arXiv1610.00850v3, Mar. 29, 2017, 8 pages.
Laskey et al. "DART: Noise injection for robust imitation learning," arXiv 1703.09327v2, Oct. 18, 2017, 14 pages.
Lee et al. "Convolution neural network-based lane change intention prediction of surrounding vehicles for acc." IEEE 20th International Conference on Intelligent Transportation Systems, Oct. 16, 2017, 6 pages.
Luo et al. "Fast and furious: Real time end-to-end 3d detection, tracking and motion forecasting with a single convolutional net," Proceedings of the IEEE Conference on Computer Vision and Pattern Recognition, Jun. 2018, 9 pages.
Muller et al. "Driving policy transfer via modularity and abstraction," arXiv 1804.09364v3, Dec. 13, 2018, 15 pages.
Paden et al. "A survey of motion planning and control techniques for self-driving urban vehicles," arXiv1604.07446v1, Apr. 25, 2016, 27 pages.
Pan et al. "Virtual to real reinforcement learning for autonomous driving," arXiv 1704.03952v4 Sep. 26, 2017, 13 pages.
Pei et al. "DeepXplore: Automated whitebox testing of deep learning systems," arXiv1705.06640v4, Sep. 24, 2017, 18 pages.
Pomerleau. "Alvinn: An autonomous land vehicle in a neural network," Advances in neural information processing systems, Nov. 1989, 9 pages.
Ross et al. "A reduction of imitation learning and structured prediction to no-regret online learning," Proceedings of the fourteenth International Conference on Artificial Intelligence and Statistics, Jun. 14, 2011, 9 pages.
Sauer et al. "Conditional affordance learning for driving in urban environments," arXiv 1806.06498v3, Nov. 3, 2018, 16 pages.
Shalev-Shwartz et al. "Safe, multi-agent, reinforcement learning for autonomous driving," arXiv 1610.03295, Oct. 11, 2016, 13 pages.
Tian et al. "Deeptest: Automated testing of deep-neural-network-driven autonomous cars," arXiv 1708.08559v2, Mar. 20, 2018, 12 pages.
Yang et al. "Hdnet: Exploiting hd maps for 3d object detection," Conference on Robot Learning, Oct. 23, 2018, 10 pages.
PCT International Preliminary Report on Patentability in International Appln. No. PCT/US2018/044172, dated Feb. 6, 2020, 13 pages.
PCT International Search Report and Written Opinion issued in International Application No. PCT/US2018/044172, dated Oct. 31, 2018, 20 pages.
Tomar et al. "Neural Network Based Lane Change Trajectory Prediction in Autonomous Vehicles," International Conference of Medical Image Computing and Computer-Assisted Intervention, Aug. 31, 2011, 22 pages.
Bojarski et al. "End to End Learning for Self-Driving Cars," arXiv 1604.07316v1, Apr. 25, 2016, 9 pages.
Chi et al. "Deep Steering: Learning End-to-End Drivign model from Spatial and Temporal Visual Cues" arXiv 1708.03798v1, Aug. 12, 2017, 12 pages.
Xu et al ."End-to-End Learning of Driving Models from Large-scale Video Datasets," arXiv preprint Jul. 1, 2017, 9 pages.
Yang et al. "End-to-End Mutli-Modal Multi Task Vehicle Control for Self-driving Cars with Visual perceptions," arXiv 1801.06734., Feb. 2, 2018, 6 pages.
Furfaro et al., "Waypoint-Based Generalized ZEM/ZEV Feedback Guidance for Planetary Landing via a Reinforcement Learning Approach," 3rd International Academy of Astronautics Conference on Dynamics and Control of Space Systems, DyCoSS 2017, Jan. 2017, 1-16.
Wolf et al., "360-Degree Visual Detection and Target Tracking on an Autonomous Surface Vehicle," Journal of Field Robotics, Oct. 2010, 27(6):819-833.

* cited by examiner

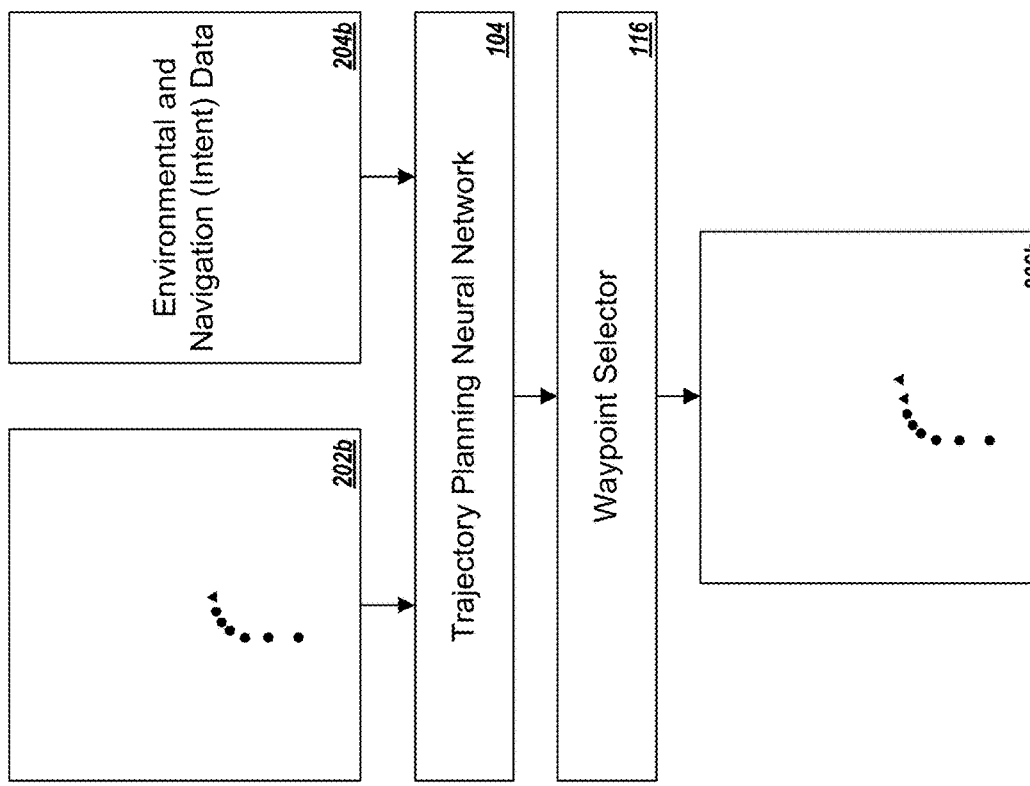
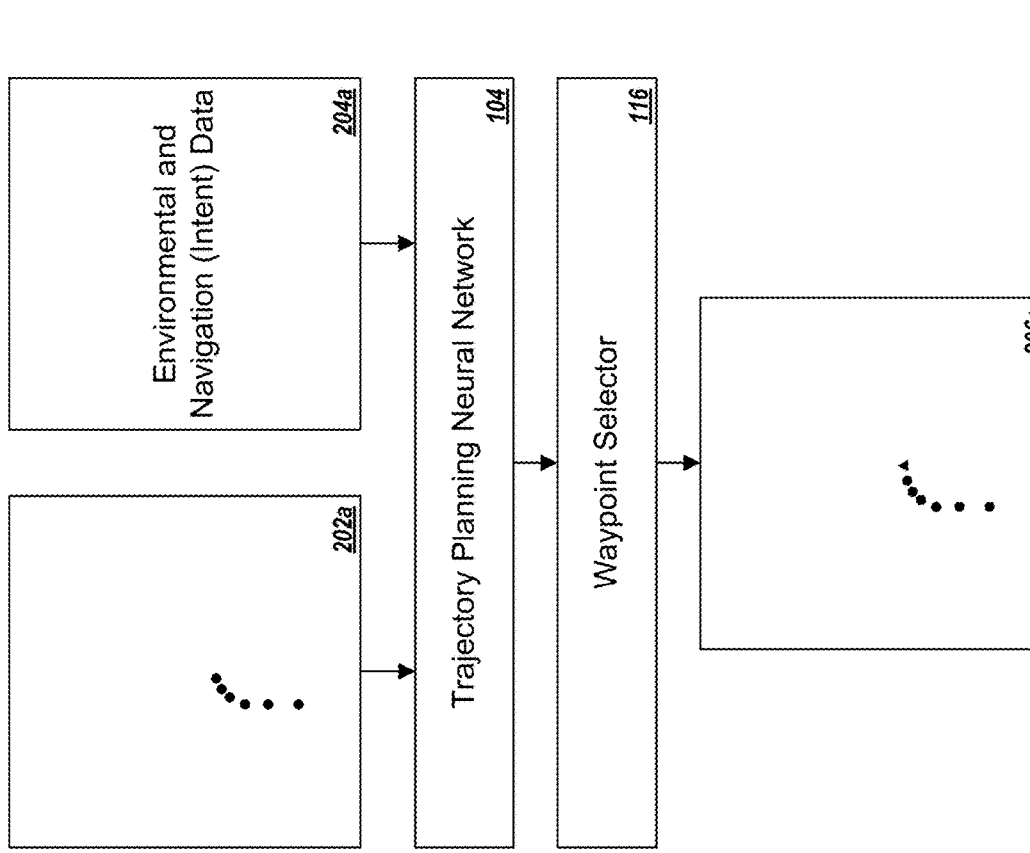

NEURAL NETWORKS FOR VEHICLE TRAJECTORY PLANNING

TECHNICAL FIELD

This specification describes a computer-implemented neural network system configured to plan a trajectory for a vehicle.

BACKGROUND

Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. The transformation operations can be characterized by values of internal parameters of the neural network. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture may specify which layers provide their output as input to which other layers and how the output is provided.

In general, the transformation operations of each layer of a neural network are performed by one or more computers at one or more locations that are configured to implement the transformation operations. Thus, a layer being described as performing operations means that the computers implementing the transformation operations of the layer perform the operations.

SUMMARY

This specification describes neural network systems that are configured to plan a trajectory for a vehicle. In some implementations, such systems are deployed on autonomous or semi-autonomous vehicles in order to guide movement of the vehicle as it travels toward a goal location or along an intended route.

Autonomous and semi-autonomous vehicles use computing systems to make driving decisions and to at least partially effect control of the vehicle. A fully autonomous vehicle can include computer-based control systems that make fully autonomous driving decisions to effect fully autonomous control independent of a human driver, whereas a semi-autonomous vehicle can include computer control systems that make semi-autonomous driving decisions to effect semi-autonomous control that aids a human driver. In some implementations, the autonomous or semi-autonomous vehicle is an automobile, e.g., a sedan, a lorry, a pickup truck, a van, a sport utility vehicle, or a motorcycle. In other implementations, the vehicle is a watercraft, e.g., a boat, or an aircraft, e.g., an airplane or helicopter.

Autonomous and semi-autonomous vehicles may include one or more environmental sensing systems that monitor the environment of a vehicle. For example, a light detection and ranging (LIDAR) system, a radio detection and ranging (RADAR) system, a camera subsystem, or a combination of these and other sensing systems, may continuously sweep an area surrounding the vehicle on which the sensing systems are installed, e.g., a vicinity of the vehicle. The sensing systems generate sensor data from the sweeps that characterize aspects of the current environment of the vehicle. In some implementations, the vehicle's computing systems are configured to process sensor data from one or more sensing systems in real-time and to project the data onto a 2D-space to form an image. The image may represent the results of sweeps by one or more sensing systems.

In order to make effective driving decisions, the computing systems of an autonomous or semi-autonomous vehicle may process information derived from sensor data from the vehicle's sensing systems. For instance, information about a vehicle's environment can be processed, along with navigation data and information about previous locations of the vehicle, to determine a planned trajectory of the vehicle. The planned trajectory can indicate a series of waypoints that each represent a proposed location for the vehicle to maneuver to at a time in the near future. In some implementations, the system selects waypoints taking into account an intended route or destination of the vehicle, safety (e.g., collision avoidance), and ride comfort for passengers in the vehicle.

Some implementations of the subject matter disclosed herein include a computing system for planning a trajectory of a vehicle. The system can include a memory configured to store waypoint data indicating one or more waypoints, each waypoint representing a previously traveled location of the vehicle or a location in a planned trajectory for the vehicle, one or more computers, and one or more storage devices storing instructions that when executed cause the one or more computers to implement a trajectory planning neural network and a trajectory management system. The trajectory planning neural network can be configured to, at each time step of multiple time steps: obtain a first neural network input and a second neural network input, wherein (i) the first neural network input characterizes a set of waypoints indicated by the waypoint data, and (ii) the second neural network input characterizes (a) environmental data that represents a current state of an environment of the vehicle and (b) navigation data that represents a planned navigation route for the vehicle; and process the first neural network input and the second neural network input to generate a set of output scores, wherein each output score in the set of output scores corresponds to a different location of a set of possible locations in a vicinity of the vehicle and indicates a likelihood that the respective location is an optimal location for a next waypoint in the planned trajectory for the vehicle to follow the planned navigation route. The trajectory management system can be configured to, at each time step of the multiple time steps: select, based on the set of output scores generated by the trajectory planning neural network at the time step, one of the set of possible locations as the waypoint for the planned trajectory of the vehicle at the time step; and update the waypoint data by writing to the memory an indication of the selected one of the set of possible locations as the waypoint for the planned trajectory of the vehicle at the time step.

These and other implementations can optionally include one or more of the following features.

For an initial time step of the multiple time steps, the set of waypoints characterized by the first neural network input can include at least one waypoint that represents a previously traveled location of the vehicle at a time that precedes the multiple time steps.

For each time step of the multiple time steps after the initial time step, the set of waypoints characterized by the first neural network input can include the waypoints that were determined at each preceding time step of the multiple time steps.

For at least one time step of the multiple time steps after the initial time step, the set of waypoints characterized by the first neural network input can include: (i) one or more first waypoints that represent previously traveled locations of the vehicle at times that precede the multiple time steps, and (ii) one or more second waypoints that were determined at preceding time steps of the multiple time steps.

The trajectory planning neural network can be a feedforward neural network.

The second neural network input at each time step of the multiple time steps can characterize the environmental data that represents the current state of the environment of the vehicle at the time step.

The second neural network input can characterize multiple channels of environmental data. The multiple channels of environmental data can include two or more of roadgraph data representing one or more roads in the vicinity of the vehicle, perception object data representing locations of objects that have been detected as being in the vicinity of the vehicle, speed limit data representing speed limits associated with the one or more roads in the vicinity of the vehicle, light detection and ranging (LIDAR) data representing a LIDAR image of the vicinity of the vehicle, radio detection and ranging (RADAR) data representing a RADAR image of the vicinity of the vehicle, camera data representing an optical image of the vicinity of the vehicle, or traffic artifacts data representing identified traffic artifacts in the vicinity of the vehicle.

The second neural network input at each time step of the multiple time steps can characterize the navigation data that represents the planned navigation route for the vehicle.

The second neural network input at each time step of the multiple time steps can characterize both the environmental data that represents the current state of the environment of the vehicle at the time step and the navigation data that represents the planned navigation route for the vehicle.

Each successive pair of time steps in the multiple time steps can represent a successive pair of real-world times that are separated by a fixed interval in the range 100 milliseconds to 500 milliseconds.

A vehicle control subsystem can be configured to determine control actions for the vehicle to take to cause the vehicle to maneuver along a planned trajectory defined by the waypoints for at least some of the multiple time steps.

The vehicle can be maneuvered along the planned trajectory as a result of executing at least some of the control actions determined by the vehicle control subsystem, wherein the control actions include at least one of steering, braking, or accelerating the vehicle.

Some implementations of the subject matter disclosed herein include a computer-implemented method for planning a trajectory of a vehicle. The method can include, for each time step in a series of time steps: obtaining a first neural network input that characterizes a set of waypoints that each represent a previous location of the vehicle or a location in a planned trajectory for the vehicle; obtaining a second neural network input that characterizes (i) environmental data that represents a current state of an environment of the vehicle and (ii) navigation data that represents a planned navigation route for the vehicle; providing the first neural network input and the second neural network input to a trajectory planning neural network and, in response, obtaining a set of output scores from the trajectory planning neural network, each output score corresponding to a respective location of a set of possible locations in a vicinity of the vehicle and indicating a likelihood that the respective location is an optimal location for a next waypoint in the planned trajectory for the vehicle to follow the planned navigation route; and selecting, based on the set of output scores, one of the possible locations in the vicinity of the vehicle as a waypoint for the planned trajectory of the vehicle at the time step.

These and other implementations can optionally include one or more of the following features.

For each time step in the series of time steps after an initial time step, the set of waypoints characterized by the first neural network input at the time step can represent the locations of the vehicle that were selected at each preceding time step in the series of time steps.

The set of waypoints characterized by the first neural network input at the initial time step can represent locations that the vehicle has traversed at particular times that precede the series of time steps.

For at least one of the series of time steps: the second neural network input can characterize multiple channels of environmental data, and the multiple channels of environmental data can include two or more of roadgraph data representing one or more roads in the vicinity of the vehicle, perception object data representing locations of objects that have been detected as being in the vicinity of the vehicle, speed limit data representing speed limits associated with the one or more roads in the vicinity of the vehicle, light detection and ranging (LIDAR) data representing a LIDAR image of the vicinity of the vehicle, radio detection and ranging (RADAR) data representing a RADAR image of the vicinity of the vehicle, camera data representing an optical image of the vicinity of the vehicle, or traffic artifacts data representing identified traffic artifacts in the vicinity of the vehicle.

At each time step in the series of time steps, the system can write an indication in memory of the selected one of the possible locations in the vicinity of the vehicle as the waypoint for the planned trajectory of the vehicle at the time step.

The system can determine control actions for the vehicle to take to cause the vehicle to maneuver along a planned trajectory defined by the waypoints for at least some of the series of time steps.

Each successive pair of time steps in the series of time steps can represent a successive pair of real-world times that are separated by a fixed interval in the range 100 milliseconds to 500 milliseconds.

Some implementations of the subject matter disclosed herein include a computer-implemented method for training a trajectory planning neural network system to determine waypoints for trajectories of vehicles. The method can include obtaining, by a neural network training system, multiple training data sets. Each training data set can include: (i) a first training input that characterizes a set of waypoints that represent respective locations of a vehicle at each of a series of first time steps, (ii) a second training input that characterizes at least one of (a) environmental data that represents a current state of an environment of the vehicle or (b) navigation data that represents a planned navigation route for the vehicle, and (iii) a target output characterizing a waypoint that represents a target location of the vehicle at a second time step that follows the series of first time steps. The neural network training system can train the trajectory planning neural network system on the multiple training data sets, including, for each training data set of the multiple training data sets: processing the first training input and the second training input according to current values of parameters of the trajectory planning neural network system to generate a set of output scores, each output score corresponding to a respective location of a set of possible locations in a vicinity of the vehicle; determining an output error using the target output and the set of output scores, and adjusting the current values of the parameters of the trajectory planning neural network system using the output error.

These and other implementations of the subject matter disclosed herein can optionally include one or more of the following features.

For each training data set in at least a subset of the multiple training data sets, the target output of the training data set can characterize a waypoint that represents an actual location of a human-operated vehicle at a time that corresponds to the second time step.

For each training data set in at least the subset of the multiple training data sets, the second training input can characterize navigation data that represents a route that was prescribed for a driver of the human-operated vehicle to follow and that was traversed by the vehicle.

For each training data set in at least the subset of the multiple training data sets, the second training input can further characterize environmental data that represents the current state of the environment of the human-operated vehicle.

For each training data set in at least a subset of the multiple training data sets, (i) the target output of the training data set can characterize a waypoint that represents a location of a virtual vehicle that was driven in a simulated environment at a time that corresponds to the second time step, and (ii) the second training input can characterize navigation data that represents a route that was prescribed for an automated agent of the virtual vehicle to follow while driving in the simulated environment and that was traversed by the virtual vehicle.

The neural network training system can identify that the second subset of the multiple training data sets models driving behavior for one or more specified driving scenarios. In response to identifying that the second subset of the multiple training data sets models behavior for the one or more specified driving scenarios, the neural network training system can select the second subset of the multiple training data sets for inclusion in the multiple training data sets.

The one or more specified driving scenarios can include at least one of a lane merge scenario, an unprotected left turn scenario, a lane change scenario, or a collision scenario.

Total numbers of waypoints characterized by the first training inputs among particular ones of the multiple training data sets are different from each other.

Obtaining the multiple training data sets can include: (i) selecting a first subset of training data sets with which to train the trajectory planning neural network system based on an indication that the second training inputs of the first subset of training data sets characterize environmental data from a first set of sensor channels, and (ii) selecting a second subset of training data sets with which to train the trajectory planning neural network system based on an indication that the second training inputs of the second subset of training data sets characterize environmental data from a second set of sensor channels, wherein the second set of sensor channels includes at least one sensor channel that is not included in the first set of sensor channels.

The at least one sensor channel that is included in the second set of sensor channels but not in the first set of sensors channels can be a light detection and ranging (LIDAR) sensor channel.

Obtaining the multiple training data sets can include oversampling a first subset of training data sets that model driving behavior for one or more specified driving scenarios at a greater frequency than the specified driving scenarios occur in the real-world.

Obtaining the multiple training data sets can include: identifying multiple candidate training data sets, filtering the multiple candidate training data sets based on one or more criteria, and selecting to train the trajectory planning neural network system on candidate training data sets that satisfy the one or more criteria, to the exclusion of candidate training data sets that do not satisfy the one or more criteria.

Filtering the multiple candidate training data sets based on the one or more criteria can include discarding candidate training data sets that model driving behavior that is determined to violate a legal restriction. The legal restriction is a speed limit.

For each training data set of the multiple training data sets, the second training input that characterizes at least one of the environmental data or the navigation data can have been generated by processing at least one of the environmental data or the navigation data using an encoder neural network.

For a group of training data sets selected from the multiple training data sets, the training system can: for each training data set in the group of training data sets, processing the first training input and the second training input according to current values of parameters of the trajectory planning neural network system to generate a respective set of output scores for the training data set; determining the output error using the target outputs and the respective sets of output scores of all the training data sets in the group of training data sets; and adjusting the current values of the parameters of the trajectory planning neural network system using the output error.

The group of training data sets can model driving behavior of a same vehicle over a series of time steps.

Some implementations of the subject matter disclosed herein include one or more non-transitory computer-readable media having instructions stored thereon that, when executed by data processing apparatus, cause the data processing apparatus to perform operations of any of the computer-implemented methods disclosed herein. Some implementations further include the data processing apparatus.

Some implementations of the subject matter described herein can, in certain instances, realize one or more of the following advantages. First, a neural network system may generate a trajectory for a vehicle that satisfies criteria for vehicle navigation, such as criteria that improves passenger safety and comfort. For example, a planned trajectory for a vehicle may mimic or resemble trajectories that would be taken by human drivers. Second, a trajectory planning neural network system can be used to select waypoints in a planned trajectory for a vehicle. The neural network system may improve the selection of waypoints so that a planned trajectory that results from the selected waypoints meets safety and comfort objectives for passengers in a vehicle. Third, the complexity of the trajectory planning neural network system can be reduced by storing waypoints in a memory that is external to the neural network system. The neural network system can be conditioned on previously selected waypoints in a planned trajectory by processing an input that represents the previously selected waypoints, rather than maintaining such information in internal memory of the neural network system. The use of external memory can thus reduce the size and complexity of the neural network system as compared to other approaches, and may also reduce the complexity of training the neural network system and the computational expense required to determine waypoints for a planned trajectory. An external memory is also beneficial in preventing the neural network system from losing memory of previously selected waypoints over time. Even the most sophisticated and well-trained recurrent neural networks (RNNs), such as LSTM networks, are prone to losing memory over time. Moreover, neural network systems with external memory tend to generalize better than RNNs to processing longer sequences.

Additional features and advantages will be apparent to a skilled artisan in view of the disclosure contained herein

DESCRIPTION OF DRAWINGS

FIGS. 2A-2D conceptually illustrate example techniques for selecting waypoints in a planned trajectory for a vehicle.

DETAILED DESCRIPTION

Figure 1:
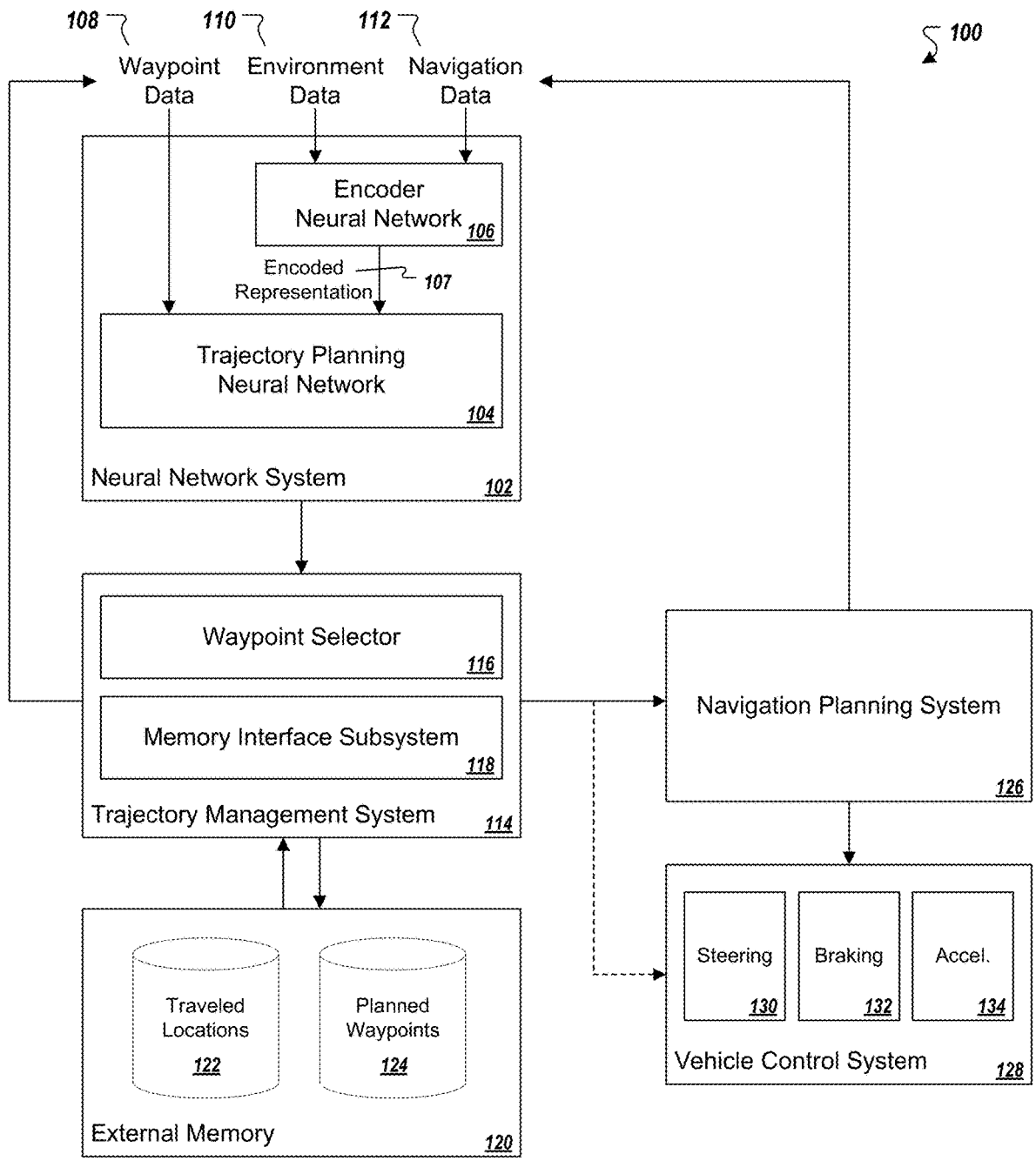
FIG. 1 is a block diagram of an example computing environment of an autonomous or semi-autonomous vehicle.

FIG. 1 depicts a block diagram of an example computing environment 100 of an autonomous or semi-autonomous vehicle. The environment 100 includes various systems to provide automated or semi-automated control of a vehicle, such as an automobile (e.g., a street vehicle), a motorcycle, or a watercraft. The vehicle may be a physical vehicle in a real-world environment or a virtual vehicle in a simulated environment. In some implementations, systems 102, 114, 126, and 128 can be implemented as computer programs on one or more computers. The computers for these systems, along with the external memory 120, can be physically installed on a vehicle so that the systems are arranged to travel along with the vehicle and to perform local processing for generating and executing planned trajectories. In other implementations, one or more computers may be located off-board the vehicle, and the vehicle can communicate with these computers over a network (e.g., the Internet).

The environment 100 includes a neural network system 102, a trajectory management system 114, an external memory 120, a navigation planning system 126, and a vehicle control system 128. In general, the neural network system 102 is configured to process input data components 108, 110, and 112, to score a set of locations in a vicinity of a vehicle. The score for a given location can represent a likelihood that the location is an optimal location for inclusion as a waypoint in a planned trajectory for the vehicle.

The trajectory management system 114 processes the scores from the neural network system 102 to select one of the locations as a waypoint for a given time step in the planned trajectory. The trajectory management system 114 also interfaces with external memory 120, which stores information about previous locations of the vehicle, e.g., locations previously traveled by the vehicle, locations previously selected for a planned trajectory (i.e., planned waypoints), or both. Similar operations can be performed over a series of time steps to iteratively select waypoints that collectively define a planned trajectory for the vehicle.

In some implementations, the neural network system 102 and the trajectory management system 114 are configured to interact with a navigation planning system 126, which generates navigation data 112 representing a planned navigation route of the vehicle. The planned navigation route can indicate one or more goal locations of the vehicle's travel and, optionally, a targeted path to arrive at the goal locations.

In further detail, the neural network system 102, in coordination with the trajectory management system 114, is configured to generate a planned trajectory for a vehicle by determining, at each of a series of time steps, a waypoint for the planned trajectory at the time step. At each time step, the system 102 processes neural network inputs that include waypoint data 108, environmental data 110, and navigation data 112 to generate a set of scores that each correspond to a different location in a vicinity of the vehicle. Each score can indicate a likelihood that its corresponding location is an optimal location for the vehicle to travel to at the current time step of the planned trajectory. For example, each score can represent how well its corresponding location optimizes criteria for vehicle operation such as adherence to a planned route for the vehicle, passenger safety and comfort. A waypoint selector 116 of the trajectory management system 114 can then select one of the scored locations in the vicinity of the vehicle as a waypoint for the planned trajectory at the current time step based on the set of scores generated by the neural network system 102, e.g., by selecting the location corresponding to the highest score in the set of scores.

At each time step, the neural network system 102 processes a neural network input that includes waypoint data 108. The waypoint data 108 identifies a set of previous locations of the vehicle before the current time step. The previous locations identified by the waypoint data 108 can be previously traveled locations of the vehicle before the current time step, i.e., actual locations at which the vehicle was recently located, planned locations of the vehicle before the current time step, i.e., waypoints in the planned trajectory that have already been generated at time steps before the current time steps, or both. For example, the neural network system 102 may take part in generating a planned trajectory for a vehicle that includes 20 waypoints, where each waypoint in the planned trajectory represents a planned location of the vehicle at a respective time step in a series of time steps (i.e., one time step for each waypoint). At the first time step, $t_1$, all of the locations identified by the waypoint data 108 may be previously traveled locations at which the vehicle was actually driven at one or more time steps before $t_1$. After the first time step (e.g., at time steps $t_2$ through $t_{20}$), the waypoint data 108 may identify each of the waypoints (i.e., planned locations) from $t_1$ through the most recent time step that immediately precedes the current time step. For instance, at time step $t_9$, the waypoint data 108 may identify each of the planned locations of the vehicle from $t_1$ through $t_8$.

Optionally, the waypoint data 108 at a given time step after the initial time step $t_1$ can further include indications of one or more actual locations at which the vehicle was observed before $t_1$. For example, a set of previously traveled locations indicated by the waypoint data 108 at time step $t_1$ can be maintained at each time step following $t_1$. Thus, at each time step after $t_1$, the planned location that was predicted at the immediately preceding time step is added to the waypoint data 108, but none of the traveled locations from time steps before $t_1$ are removed from the waypoint data 108. Alternatively, all or some of the previously traveled locations from before $t_1$ can be removed from the waypoint data 108 for time steps after the initial time step $t_1$ in a series of time steps for a planned trajectory. For example, the systems may adopt a sliding window approach in which traveled locations of the vehicle from time steps before $t_1$ are gradually phased out of the waypoint data 108 by removing the oldest remaining traveled location each time a new planned location is added to the waypoint data 108. In other implementations, the traveled locations indicated by the waypoint data 108 may all be removed from the waypoint data 108 immediately after $t_1$ or at another specified time step.

In some implementations, the real-world time interval represented by each successive time step in a series of time steps for a planned trajectory is fixed. For example, if the real-world time interval between successive time steps is 100 milliseconds, then a planned trajectory defined by 20 waypoints would represent planned locations of a vehicle over the next two seconds at each 100 millisecond interval. In some implementations, the real-world time interval between successive time steps in a planned trajectory is in the range 100 milliseconds to 500 milliseconds, and can preferably be in the range 100 milliseconds to 200 milliseconds.

The neural network system 102 can further process a neural network input that includes environmental data 110 to generate scores for the possible waypoint locations at each time step. In general, environmental data 110 is data that characterizes a current state of an environment of the vehicle. The environmental data 110 can characterize a wide range of environmental factors, and in some implementations, the data 110 can include multiple data channels that each represent a different environmental factor.

In some implementations, the environmental data 110 includes sensor data that characterizes information about the vehicle's current environment captured by one or more sensing subsystems on the vehicle. An autonomous or semi-autonomous vehicle may include multiple sensing subsystems for sensing information about the environment in proximity of the vehicle. For example, a first sensing subsystem may be a light detection and ranging (LIDAR) system that emits and detects reflections of laser light, and a second sensing subsystem may be a radio detection and ranging (RADAR) system that emits and detects reflections of radio waves. Additional sensing subsystems may also be provided on a vehicle, such as a camera system that detects reflections of visible light.

Figure 3:
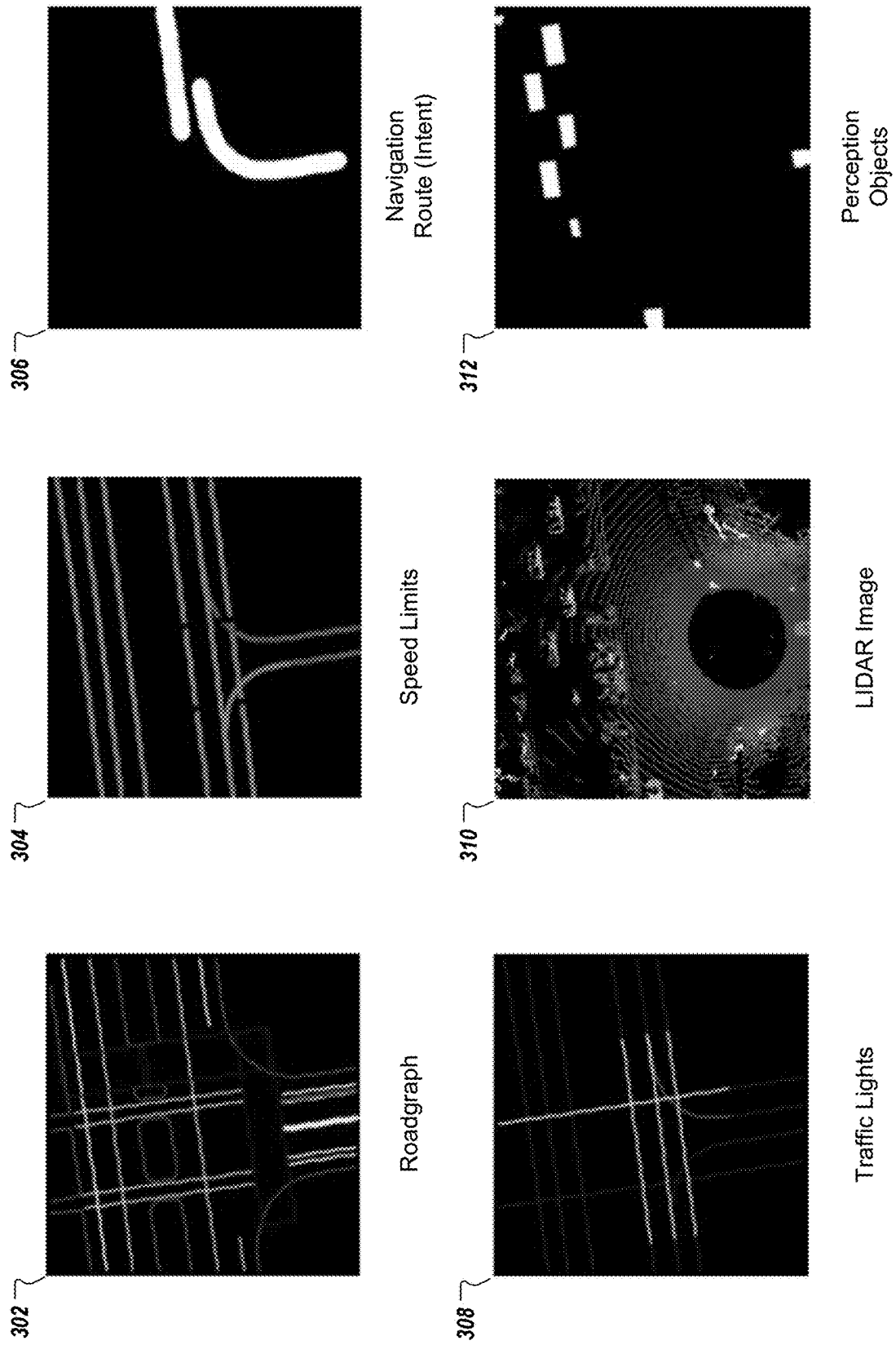
FIG. 3 shows a set of images representing example environmental data and navigation data that may be processed by a trajectory planning neural network system.

The sensing subsystems can generate sensor data that indicates, for example, a distance of reflected radiation (e.g., laser light, radio waves, or visible light), a direction of the reflected radiation, an intensity of the reflected radiation, or a combination of these. A given sensing subsystem can transmit one or more pulses of electromagnetic radiation in a particular direction and can measure the intensity of any reflections as well as the elapsed time between emitting the radiation and receiving the reflective signal. A distance between an object in the environment and the current position of the vehicle can be determined based on the elapsed time between emitting the radiation and receiving the reflective signal. The sensing subsystems can each continually sweep a particular space in angle, azimuth, or both. Sweeping in azimuth, for example, can allow a sensing subsystem to detect multiple objects along a same line of sight. In some implementations, the environmental data 110 includes a sensor input image, where the input image is a 2D projection of sensor data for a partial sweep, a single sweep, or multiple sweeps of one or more sensing subsystems of the vehicle. A LIDAR input image, for example, may be formed by generating a 2D projection of a LIDAR sweep around a vehicle. In some implementations, the sensor input image may characterize sweeps from multiple sensing subsystems. FIG. 3 shows an example LIDAR input image 310.

The environmental data 110 may further include one or more non-sensor channels, i.e., channels that characterize information about the environment in a vicinity of the vehicle obtained from sources other than the vehicle's sensing systems. In some implementations, the environmental data 110 includes a roadgraph channel for data that describes roads in the vicinity of the vehicle. For example, FIG. 3 shows an image 302 representing data from an example roadgraph channel. Roadgraph data can indicate the path of roads in the vicinity of the vehicle, lane boundaries, and other features of roads, parking lots, or other driving surfaces in the vicinity of the vehicle.

In some implementations, the environmental data 110 includes a speed limit channel. The speed limit channel indicates the speed limits that apply at each location of the roads in the vicinity of the vehicle (e.g., roads identified by the roadgraph data). The speed limits indicated by the speed limit channel may be a legal speed limit set by a governing authority in the location of the vehicle. Alternatively, the speed limits indicated by the speed limit channel may be modified from the legal speed limit according to certain criteria. For example, the speed limit may be capped based on a passenger preference, road conditions (e.g., slick or icy roads), or based on the road feature at issue (e.g., ramps, intersections, and sharp turns may be assigned speed limits that are lower than a posted limit). FIG. 3 shows an example image 304 representing data from an example speed limit channel.

In some implementations, the environmental data 110 includes a traffic lights channel. The traffic lights channel indicates the locations of traffic lights in the vicinity of the vehicle (e.g., traffic lights for roads identified by the roadgraph data). The traffic lights channel can further include an indication of the current state of each traffic light, such as green, yellow, or red. FIG. 3 shows an example image 308 representing data from an example traffic lights channel.

In some implementations, the environmental data 110 includes one or more perception objects channels. Perception objects are objects that have been detected in the vicinity of the vehicle. For example, a perception objects neural network system (not shown in FIG. 1) may process data from one or more sensor channels to identify objects located nearby the vehicle. Perception objects may include other vehicles, pedestrians, vegetation, signposts, buildings, or combinations of these and other types of objects. In some implementations, the perception objects channel includes data that indicates the locations, sizes, orientations, and/or types of perception objects in the vicinity of the vehicle. Information from the perception objects channel can indicate locations to avoid in a planned trajectory of a vehicle for collision risk mitigation. FIG. 3 shows an image 312 representing data from an example perception objects channel.

The neural network system 102 is further configured to process a neural network input that includes navigation data 112. The navigation data 112 represents a planned navigation route for a vehicle. The planned navigation route may be generated independent of actual conditions of the vehicle or its environment. Accordingly, the planned navigation route is generally insufficient to indicate how the vehicle should be maneuvered along the route. The precise locations and movements for a vehicle traveling a route are instead indicated by the vehicle's planned trajectory. The planned trajectory accounts for the navigation route but also considers information about the vehicle's current environment such as objects located near the vehicle, precise lane boundaries, and traffic controls. For example, the navigation data 112 may indicate that the planned route for a vehicle runs through an intersection, but may not indicate current conditions of the intersection such as the presence of other vehicles, lane closures, or the status of a traffic light in the intersection. The planned trajectory, in contrast, may be generated so that the vehicle crosses the intersection in a safe, legal, and comfortable manner. For instance, the planned trajectory may indicate precise locations for the vehicle to follow in order to maneuver around an object, to change lanes, and to comply with applicable traffic laws, while maintaining the overall course of the planned navigation route.

In some implementations, the navigation data 112 specifies a portion of a navigation route that is within the current context of the vehicle. The current context of the vehicle represents an area surrounding the vehicle (in vicinity of the vehicle) that is considered in the roadgraph and other data channels processed by the neural network system 102. For example, the current context of the vehicle may be an area between 50-200 feet surrounding the vehicle. The navigation data 112 may indicate the route the vehicle should follow within this area surrounding the vehicle. If the vehicle is near its destination, the current context may include the final destination of the planned navigation route. The planned navigation route may traverse lane centers of navigable lanes within the current context of the vehicle. In contrast, the planned trajectory may call for deviations from the lane centers, e.g., to avoid object or to safely perform a maneuver.

The neural network system 102 processes at each time step the neural network inputs that include waypoint data 108, environmental data 110, and navigation data 112 to generate the set of scores for possible waypoint locations in a planned trajectory of the vehicle. In some implementations, the neural network system 102 may include an encoder neural network 106 as a first portion of the neural network system 102 and a trajectory planning neural network 104 as a second portion of the neural network system 102. The encoder neural network 106 receives neural network inputs for the environmental data 110 and navigation data 112, and processes the inputs to generate an encoded representation 107 of the environmental data 110 and the navigation data 112. In some implementations, the encoded representation 107 is a vector of values from a last hidden layer of the encoder neural network 106. The encoder neural network 106 can be a feed-forward neural network.

The trajectory planning neural network 104 is configured to receive as inputs waypoint data 108, and the encoded representation 107 of the environmental data 110 and the navigation data 112. The trajectory planning neural network 104 is further configured to generate, using the waypoint data 108 and the encoded representation 107 (or, in other implementations, using the environmental data 110 and navigation data 112 directly rather than the encoded representation 107), and in accordance with trained values of parameters of the neural network 104, a set of scores that each indicate a likelihood of a particular location being a "best" (e.g., most optimal) location for a waypoint along a planned trajectory of the vehicle at a current time step. The trajectory planning neural network 104 can be a feedforward neural network.

Although a planned trajectory for a vehicle typically includes a collection of waypoints representing planned locations for the vehicle at each of a series of time steps, the neural network system 102 may not itself include memory to store information about which waypoints have been selected or traveled at preceding time steps. In order to condition the neural network system 102 at a given time step on the results of one or more preceding time steps, the environment 100 therefore includes a trajectory management system 114 and an external memory 120. These components 114 and 120 are configured to store indications of waypoints from preceding time steps and to update the waypoint data 108 that will be processed by the neural network system 102 at each time step based on the results of previous time steps.

The trajectory management system 114 includes a waypoint selector 116 and a memory interface subsystem 118. At each time step, the waypoint selector 116 receives the set of scores for possible waypoint locations generated by the trajectory planning neural network 104 for the time step. The waypoint selector 116 then applies one or more criteria to select a particular location from the set of possible locations as the waypoint of the planned trajectory for the current time step. For example, if the trajectory planning neural network 104 is trained to generate higher scores for locations having higher likelihoods of being an optimal waypoint for a trajectory, then the waypoint selector 116 may select the location corresponding to the highest score in the set as the waypoint for the current time step. The memory interface subsystem 118 then sends an instruction to the external memory 120 to cause an indication of the selected waypoint location to be written to the external memory 120.

The external memory 120 includes one or more computer-readable storage devices that store data indicating locations of a vehicle. In particular, the memory 120 can include a first database 122 that stores data indicating previously traveled locations of the vehicle and a second database 124 that stores data indicating waypoints of a planned trajectory of the vehicle. The previously traveled locations of the vehicle can be determined based on global positioning system (GPS) coordinates or other means for measuring the actual location of the vehicle while it is driven. The traveled locations stored in the first database 122 can include locations for each of at least n time steps preceding an initial time step at which the neural network system 102 and trajectory management system 114 begin generating a planned trajectory of the vehicle, where n is the number of previously traveled locations represented in the waypoint data 108 at the initial time step. The second database 124 can store data indicating each waypoint selected for each time step of the planned trajectory up to the current time step being processed by the neural network system 102 and the trajectory management system 114. For example, the second database 124 can create a table for a planned trajectory that stores the location of each selected waypoint in the trajectory and sequence information that sequences the waypoints relative to each other (e.g., values for each waypoint that represent the corresponding time step for the waypoint). At each time step, the waypoint selector 116 selects a particular location as the waypoint for that time step, and the memory interface subsystem 118 then writes an indication of the selected location as the waypoint for that time step in the second database 124. Moreover, at each time step, the trajectory management system 114 generates waypoint data 108 for the neural network system 102 to process at the time step. The system 114 generates waypoint data 108 by using the memory interface subsystem 118 to access the external memory 120 and reading data indicating one or more previous locations of the vehicle for one or more time steps preceding the current time step. The previous locations can include traveled locations from the first database 122, planned waypoints from the second database 124, or a combination of traveled locations and planned waypoints over a recent period of time.

The navigation planning system 126 is configured to determine a planned navigation route for a vehicle. The planned navigation route can indicate one or more goal locations of the vehicle's travel and, optionally, a targeted path to arrive at the goal locations. FIG. 3 shows an image 306 representing an example planned navigation route for a vehicle. The neural network system 102 can process navigation data 112 that characterizes a planned navigation route generated by the planning system 126. In some implementations, the planning system 126 also controls an operational mode of a vehicle. For example, during a first mode for normal autonomous driving, the planning system 126 activates the trajectory management system 114 to use planned trajectories determined using the neural network system 102 as the basis for maneuvering the vehicle. However, during some rare circumstances (e.g., impending collisions), the planning system 126 may override the trajectory management system 114 and activate a second operational mode of the vehicle that adopts a different strategy for maneuvering the vehicle. The planning system 126 may also allow a human operator to take manual control of the vehicle.

In order for a vehicle to maneuver along a planned trajectory, a sequence of control actions can be performed to cause the vehicle to follow the trajectory. The control actions can include steering, braking, and accelerating, for example. In some implementations, a vehicle can include a vehicle control system 128 that facilitates an ability of the vehicle to maneuver along a planned trajectory. The vehicle control system 128 can receive data indicating a planned trajectory (including data indicating a set of waypoints for a series of time steps) from trajectory management system 114 directly, or indirectly via the navigation planning system 126. The vehicle control system 128 processes the planned trajectory and determines a set of control actions (e.g., steering, braking, accelerations) to perform over time to cause the vehicle to maneuver along the planned trajectory. As the vehicle maneuvers along a planned trajectory, it may arrive at each of the waypoints identified in the planned trajectory at an appropriate time based on the real-world time interval between successive time steps. In some implementations, the vehicle control system 128 determines control inputs to one or more control modules of the vehicle such as a steering module 130, braking module 132, and acceleration module 134. Based on such inputs, the control modules may carry out the set of control actions determined by the vehicle control system 128 so that the vehicle is maneuvered along the planned trajectory. For example, the waypoints of a planned trajectory may be provided as input to a finite-time Linear Quadratic Regulator (LQR) based optimizer to translate the planned trajectory into actual vehicle control inputs to cause the vehicle to maneuver along the planned trajectory. In some implementations, the optimizer may adhere to one or more additional constraints beyond the waypoints of the planned trajectory in determining control inputs, such as maximum allowable vehicle speed, vehicle turning radius, and/or maximum curvature to generate control inputs for maneuvers that can be legally and feasibly performed by the vehicle.

Turning to FIGS. 2A-2D, an example process is depicted for selecting waypoints in a planned trajectory for a vehicle.

FIG. 2A illustrates selection of a first waypoint of the planned trajectory at an initial time step $t_1$. At this time step, the trajectory planning neural network 104 processes a first neural network input 202a and a second neural network input 204a. The first neural network input 202 represents waypoint data, e.g., waypoint data 108, and indicates a set of previous locations of a vehicle. In some implementations, because no planned locations for the trajectory have been predicted yet by the initial time step $t_1$, the set of previous locations indicated by the waypoint data are a set of previous locations actually traveled by the vehicle before $t_1$. The previously traveled locations are represented in FIG. 2A as circular dots in the image of the first neural network input 202. Because the time interval between successive time steps is fixed, a greater distance between dots in the image indicate that the vehicle will require a greater average speed to travel between the locations corresponding to the dots than if the dots were more closely spaced. The second neural network input represents environmental data, e.g., environmental data 110, and navigation data, e.g., navigation data 112. In some implementations, the second neural network input is an encoded representation of environment and navigation data, e.g., encoded representation 107, which results from an encoder neural network, e.g., encoder neural network 106, processing multiple channels of environment and navigation data. The trajectory planning neural network 104 generates a set of scores for possible waypoint locations, and the waypoint selector 116 selects one of the locations as the waypoint for the current time step. The selected waypoint is then stored in memory and added to a set of waypoints that define the planned trajectory of the vehicle. Image 206a shows the first waypoint of the planned trajectory for time step $t_1$ as the triangular dot that follows the trail of circular dots representing previously traveled locations of the vehicle.

FIG. 2B illustrates selection of a second waypoint of the planned trajectory at a second time step $t_2$. At this time step, the first neural network input 202b is updated to represent waypoint data that includes the selected waypoint for the planned trajectory from the preceding time step $t_1$. In the example shown in FIG. 2B, the first neural network input 202b maintains indications of the set of previously traveled locations of the vehicle from before $t_1$, but in other implementations, one or more (or all) of the previously traveled locations can be removed from the waypoint data at time step $t_2$ and subsequent time steps. The second neural network input 204b presents environment and navigation data. In some implementations, the second neural network input is updated at each time step to reflect any recent changes to the environment or navigation data since the previous time step. In other implementations, the same second neural network input is re-used at each time step, e.g., for efficiency and/or because more updated data may not be available. For example, the planned trajectory for a vehicle may be generated in such a short span of time that the environment and navigation data used at each of the time steps is still deemed current. The trajectory planning neural network 104 generates a set of scores for possible waypoint locations, and the waypoint selector 116 selects one of the locations as the waypoint for the current time step $t_2$. The selected waypoint is then stored in memory and added to a set of waypoints that define the planned trajectory of the vehicle. Image 206*b* shows the second waypoint of the planned trajectory for time step $t_2$ as the second triangular dot that follows the trail of circular dots representing previously traveled locations of the vehicle.

The process continues similarly to add additional waypoints to the planned trajectory for one or more additional time steps. FIG. 2C illustrates selection of a third waypoint of the planned trajectory at a third time step $t_3$. At this time step, the first neural network input 202*c* is updated to represent waypoint data that includes the selected waypoint for the planned trajectory from the preceding times steps $t_1$ and $t_2$. The trajectory planning neural network 104 generates a set of scores for possible waypoint locations, and the waypoint selector 116 selects one of the locations as the waypoint for the current time step $t_3$. The selected waypoint is then stored in memory and added to a set of waypoints that define the planned trajectory of the vehicle. Image 206*c* shows the third waypoint of the planned trajectory for time step $t_3$ as the third triangular dot that follows the trail of circular dots representing previously traveled locations of the vehicle.

Figure 2D:
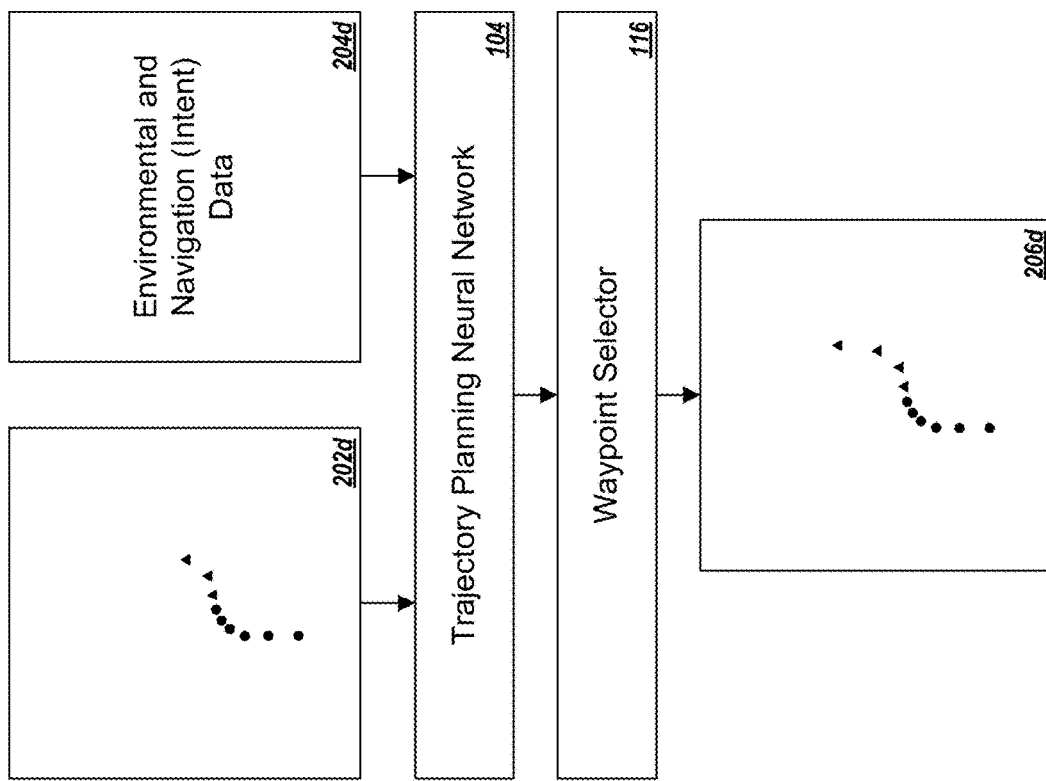
Figure 2C:
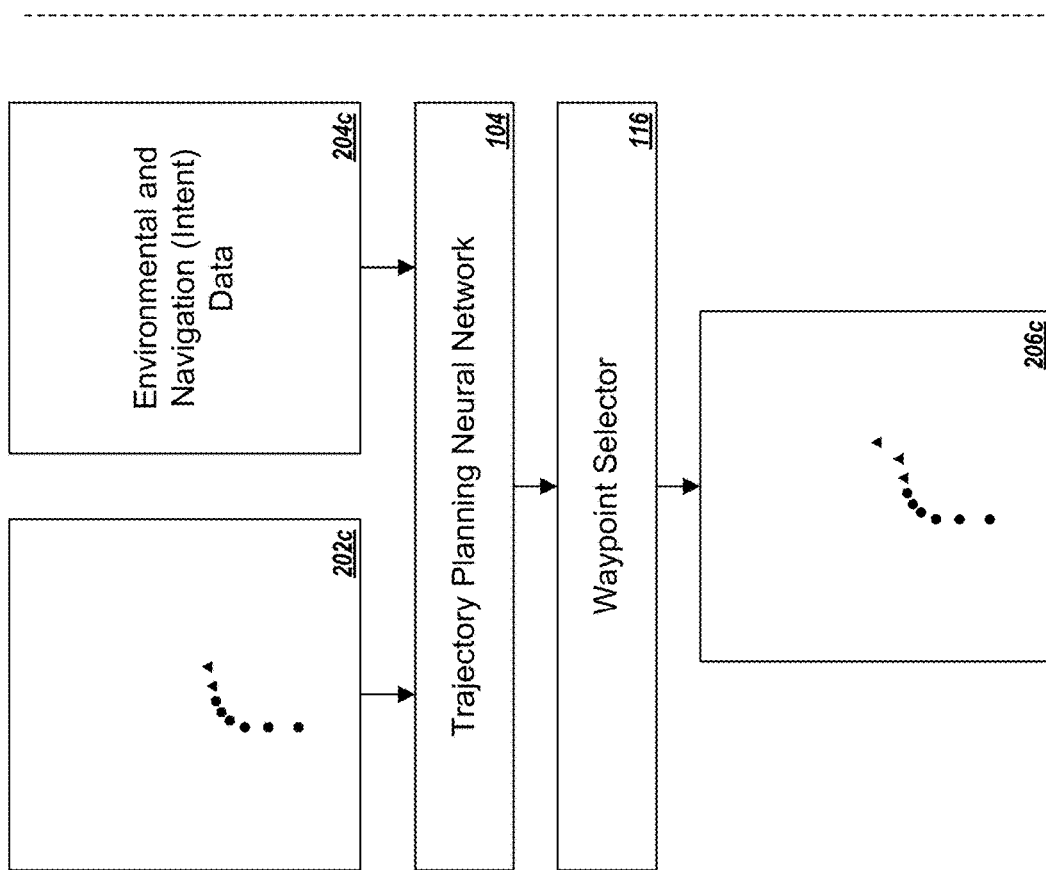

FIG. 2D illustrates selection of a fourth waypoint of the planned trajectory at a fourth time step $t_4$. At this time step, the first neural network input 202*d* is updated to represent waypoint data that includes the selected waypoint for the planned trajectory from the preceding times steps $t_1$ through $t_3$. The trajectory planning neural network 104 generates a set of scores for possible waypoint locations, and the waypoint selector 116 selects one of the locations as the waypoint for the current time step $t_4$. The selected waypoint is then stored in memory and added to a set of waypoints that define the planned trajectory of the vehicle. Image 206*d* shows the fourth waypoint of the planned trajectory for time step $t_4$ as the fourth triangular dot that follows the trail of circular dots representing previously traveled locations of the vehicle.

Figure 4:
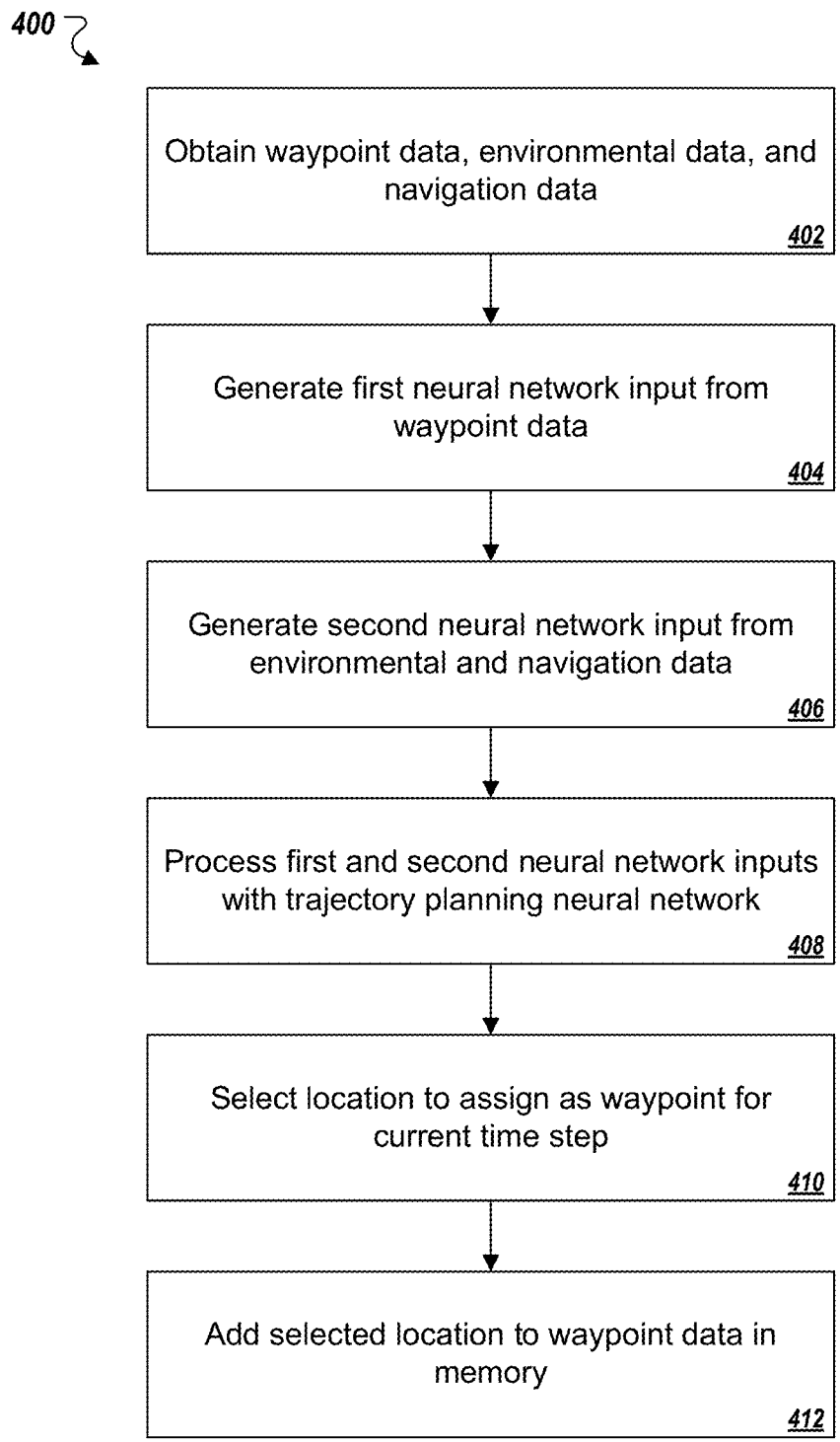
FIG. 4 is a flowchart of an example process for using a neural network system to determine waypoints for a planned trajectory of a vehicle.

FIG. 4 is a flowchart of an example process 400 of using a neural network system to determine waypoints for a planned trajectory for a vehicle.

At stage 402, a trajectory management system, e.g., trajectory management system 114, obtains waypoint data, environmental data, and navigation data for a current time step in a series of time steps of a planned trajectory for a vehicle. The waypoint data, e.g., waypoint data 108, identifies a set of previous locations of the vehicle, which may include previously traveled locations of the vehicle, planned locations of the vehicle (i.e., waypoints of the planned trajectory from preceding time steps), or both traveled locations and planned locations of the vehicle. The environmental data, e.g., environmental data 110, represents a current state of the environment of the vehicle such as objects in proximity of the vehicle, a roadgraph, and applicable traffic rules. The navigation data represents a planned navigation route for the vehicle.

At stage 404, the trajectory management system generates a first neural network input from the waypoint data. The first neural network input characterizes the waypoint data in a format that is suitable for a neural network system, e.g., neural network system 102, to process.

At stage 406, one or more encoder neural networks generate a second neural network input from the environmental data and the navigation data. First, the trajectory management system may generate inputs to the encoder neural networks that characterize the environmental data and the navigation data in a format that is suitable or processing by the encoder neural networks. Second, the encoder neural networks may process the formatted inputs to generate an encoded representation of the environmental data and the navigation data, e.g., encoded representation 107.

At stage 408, the neural network system, e.g., trajectory planning neural network 104, processes the first and second neural network inputs to generate scores for a set of locations to which the vehicle may travel. In some implementations, each score represents a likelihood that a particular location is an optimal location as a waypoint for the vehicle's planned trajectory at the current time step, where each score corresponds to a different location from the set of locations. In some implementations, the total number of scored locations is in the range 1-10, 1-100, or 1-1,000, and the physical distance in the real-world between adjacent locations is in the range 1-12 inches, 1-48 inches, or otherwise, depending on the resolution of input data.

At stage 410, a trajectory management system, e.g., waypoint selector 116 of trajectory management system 114, selects a waypoint for the planned trajectory at the current time step. The waypoint can be selected based on the set of scores generated by the trajectory planning neural network. In some implementations, the waypoint selector selects a location as the waypoint for the current time step as a result of the score for the selected location indicating that it is the most optimal waypoint location among the set of possible locations (e.g., the location with the highest score).

At stage 412, a memory interface of the trajectory management system, e.g., memory interface subsystem 118, writes to memory an indication of the selected location as the waypoint in the planned trajectory of the vehicle for the current time step. In some implementations, the indication of the selected location is recorded in a database of planned waypoints, e.g., database 124 in external memory 120.

The process 400 can be repeated for each of a series of time steps until a terminating condition is met. In some implementations, the terminating condition is that a pre-defined number of waypoints have been selected for a planned trajectory. For example, the trajectory management system 114 may be configured to generate planned trajectories of fixed size in terms of the number of waypoints in the planned trajectories. After the pre-defined number of waypoints have been determined, the trajectory is deemed complete and the systems cease repeating process 400 to determine additional waypoints. In some implementations, the number of waypoints for a planned trajectory is in the range 5 to 15. In some implementations, the number of waypoints for a planned trajectory may be adjusted based on current conditions of the vehicle, vehicle speed, the complexity of the environment in vicinity of the vehicle, or combinations of these and other factors. In each iteration of the process 400, the waypoint data is updated to add the most recently selected waypoint, so that each previously selected waypoint since an initial time step is represented in the waypoint data for a current time step.

In some implementations, the trajectory management system 114 and neural network system 102 may constantly update the planned trajectory for a vehicle. That is, the systems can begin generating a new trajectory using actual vehicle location information before the most-recently generated planned trajectory has been followed to its conclusion. For example, the systems may generate trajectories that plan the locations for a vehicle for four seconds out from the current time at which a given trajectory is created. The vehicle may follow a first of the four second trajectories for just a portion of the total length of the trajectory (e.g., 1.5-2 seconds) before it begins following a most recently generated trajectory. Because the waypoints selected at earlier time steps in each trajectory have shorter-range dependencies, the earlier waypoints may be more reliable estimations than waypoints at later time steps in a trajectory. Therefore, by constantly handing control over to a most recently generated trajectory before a previous trajectory has been completely traveled, the vehicle may more frequently be maneuvered according to earlier waypoints in the planned trajectories, while still having additional waypoints available as a buffer if a next trajectory is not yet available.

Figure 5:
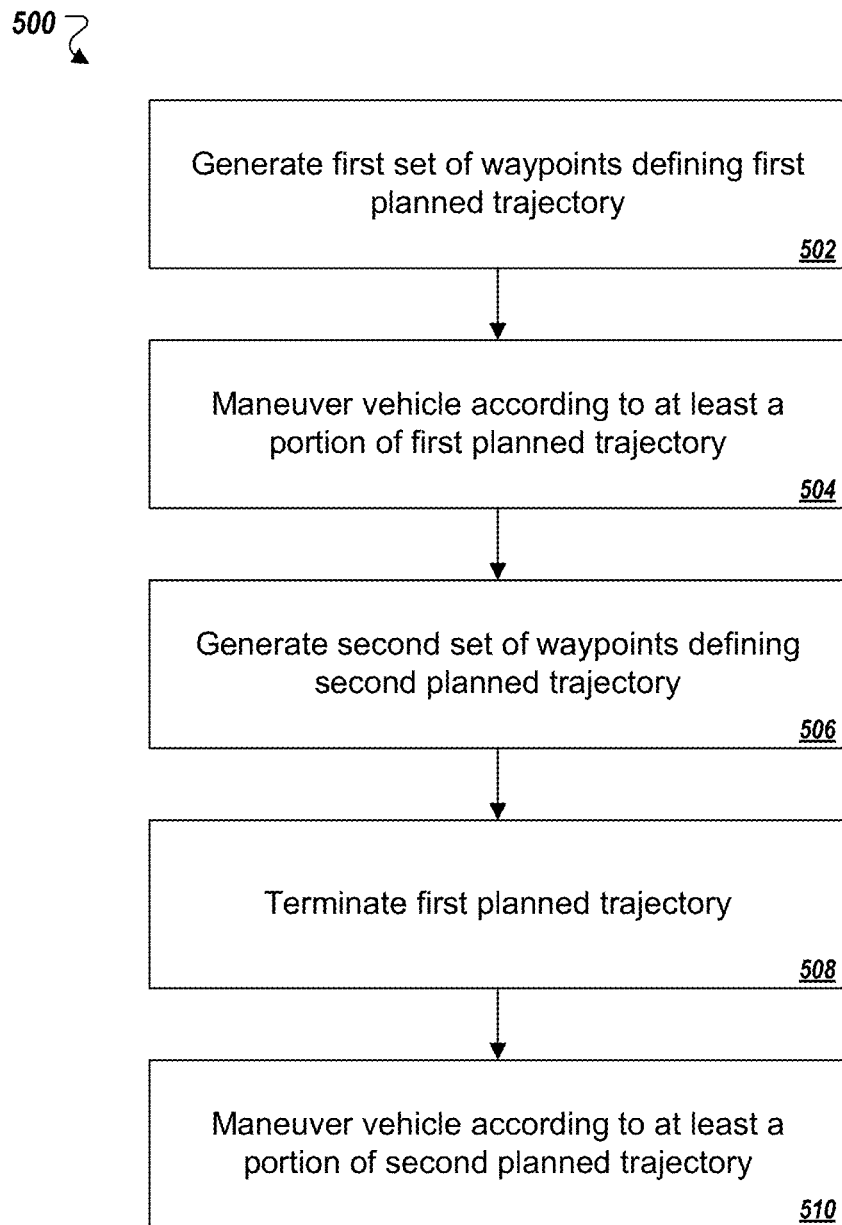
FIG. 5 is a flowchart of an example process for updating planned trajectories of a vehicle and transitioning control of the vehicle between planned trajectories.

FIG. 5 is a flowchart of an example process 500 for updating planned trajectories of a vehicle and transitioning control of the vehicle from an earlier generated trajectory to a more recently generated trajectory. At stage 502, the system generates a first set of waypoints that define a first planned trajectory. A vehicle control system on the vehicle determines a set of control actions to maneuver the vehicle according to the first planned trajectory, and the vehicle executes the set of control actions to begin following the first planned trajectory at stage 504. While maneuvering according to the first planned trajectory, at stage 506 the vehicle computing systems generate a second set of waypoints defining a second planned trajectory for the vehicle. The first time step in the second planned trajectory may correspond in real-world times to a particular time step partway through the first planned trajectory. At the particular time step in the first planned trajectory, the vehicle may terminate the first planned trajectory before it has traveled to all of its waypoints (stage 508) and begin to maneuver according to the second planned trajectory (stage 510). Process 500 may be continuously repeated to generate updated trajectories for the vehicle and to transition to most recently updated trajectories as they become available.

Figure 6:
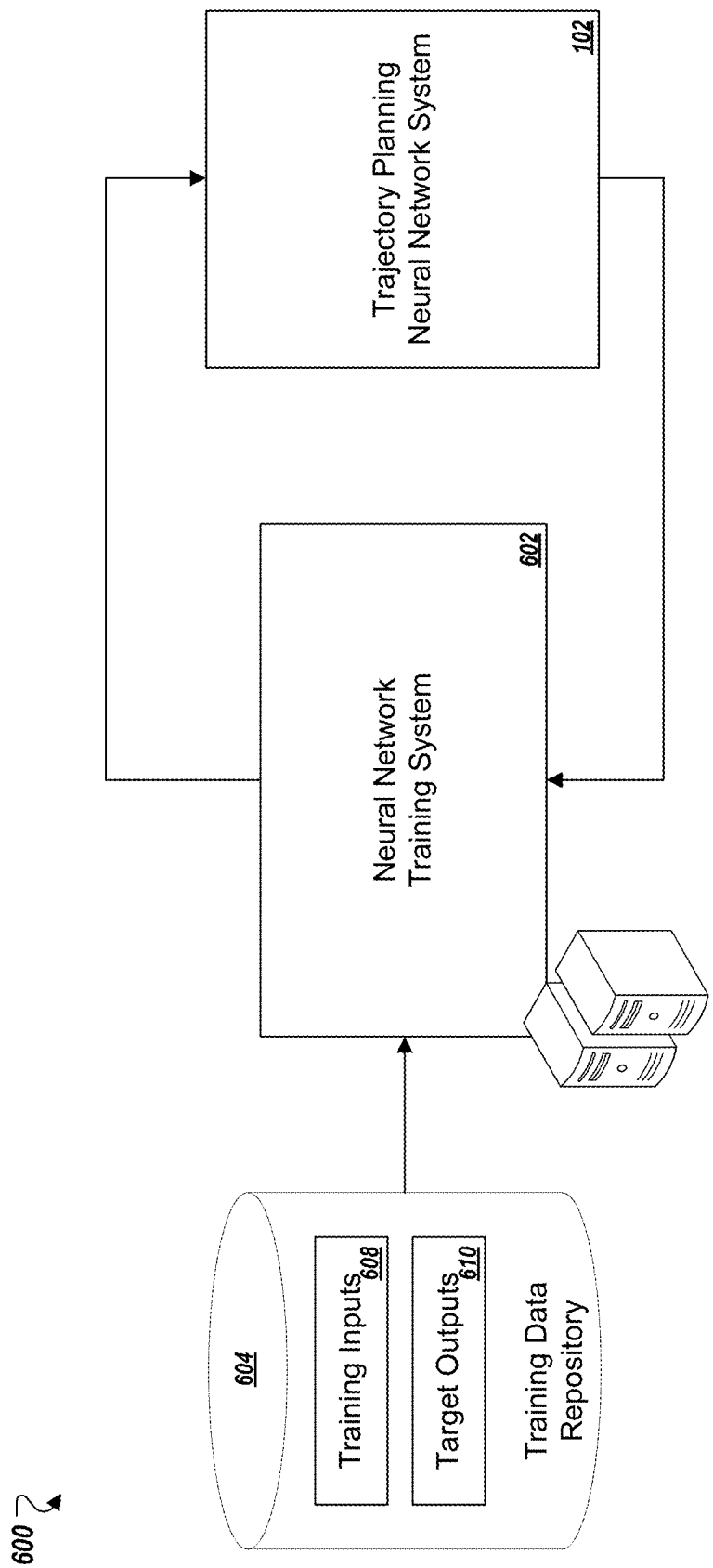
FIG. 6 is a conceptual diagram of an example environment of a neural network training system that trains a trajectory planning neural network system.

FIG. 6 is a conceptual diagram of an example environment 600 for training a trajectory planning neural network system 102. The environment 600 can include a neural network training system 602, a training data repository 604, and the trajectory planning neural network system 102. The neural network training system 602 can include one or more computers in one or more locations. The training system 602 is configured to train the trajectory planning neural network system 102 to score locations to which a vehicle may travel based on how likely each location optimizes criteria for vehicle operation in a planned trajectory for the vehicle. In some implementations, the training system 602 employs supervised machine-learning techniques to train the trajectory planning neural network system 102 using training data from training data repository 604. The training data includes training inputs 608 and target outputs 610. Further details concerning how the trajectory planning neural network system 102 can be trained are described with respect to FIG. 7.

Figure 7:
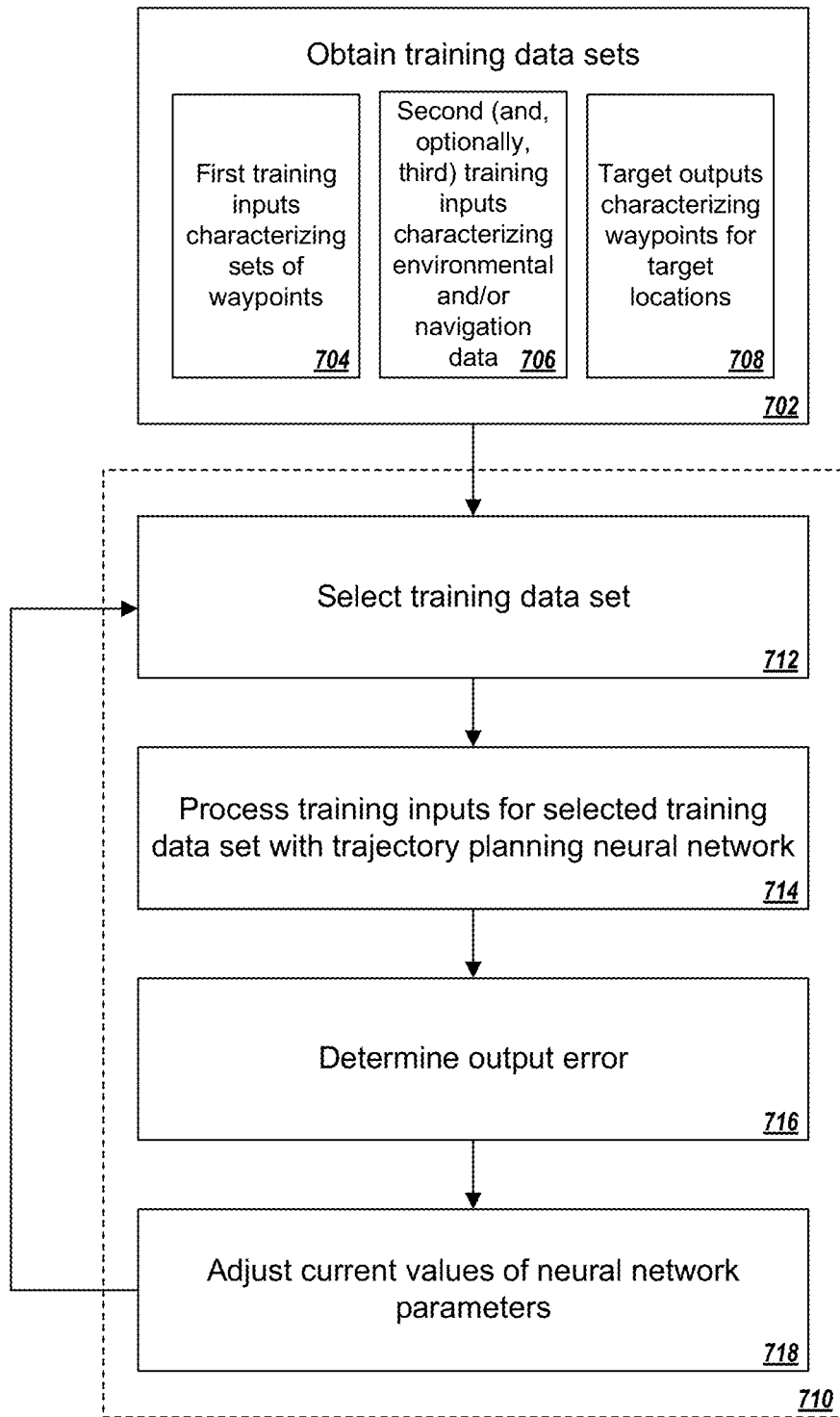
FIG. 7 is a flowchart of an example process for training a trajectory planning neural network system.

FIG. 7 depicts a flowchart of an example process 700 for training a trajectory planning neural network system. The neural network system can include an encoder neural network for processing environmental data and navigation data, e.g., encoder neural network 106, and a trajectory planning neural network for scoring locations of possible travel for a vehicle, e.g., trajectory planning neural network 104. In some implementations, the process 700 jointly trains the encoder neural network and the trajectory planning neural network. In other implementations, the process 700 trains the trajectory planning neural network alone, while the encoder neural network is trained in a separate process. The process 700 can be carried out by a neural network training system, e.g., system 602. Although the trajectory planning neural network system may be implemented on a vehicle, in some implementations, the system is trained offline by a training system that is not located on a vehicle. For example, the neural network system may be trained offline to determine trained values of the parameters of the system. The trained values can then be transmitted to the vehicle to implement a trained neural network system on the vehicle for trajectory planning.

In general, the trajectory planning neural network system can be trained by processing many samples of training data using the trajectory planning neural network system and, for each sample, adjusting the values of internal parameters of the network using an error between the predicted output generated by the network and a target output specified in the training sample.

At stage 702, the training system obtains a collection of training data sets (e.g., hundreds, thousands, or millions of training data sets). Each training data set includes a first training input 704, second and, optionally, third training inputs 706, and a target output 708.

The first training input 704 characterizes waypoint data that represents a set of previous locations of a vehicle. In some implementations, the first training input 704 is a representation of an image that depicts each of the previous locations of the vehicle in a grid of possible locations.

The second and, optionally, third training inputs 706 characterize one or more channels of environmental data for the vehicle, navigation data for the vehicle, or both. In some implementations, such as if the encoder neural network and trajectory planning neural network are trained jointly, a second training input characterizes one or more channels of environmental data and a third training input characterizes navigation data for the vehicle. In other implementations, such as if the trajectory planning neural network is trained separately, the second training input 706 is an encoded representation that combines both environmental data and navigation data and that was generated by the encoder neural network at an earlier time.

The training target outputs 708 of the training data sets represent the desired output of the trajectory planning neural network system that should result from processing the respective first and second training inputs 704, 706 of the training data sets. For example, if the first training input identifies a set of previous locations for a vehicle at each of time steps 1 through n-1, the training target output 708 can identify a particular location in a set of possible locations as the target planned location (waypoint) for the vehicle at the next time step, n. In some implementations, the training target output 708 is a vector of location scores that includes a first value (e.g., 1) for the target planned location and a second value (e.g., 0) for all other locations.

At stage 710, the training system trains the trajectory planning neural network system on the training data sets. The training can include a series of sub-stages 712-718.

At sub-stage 712, the training system selects a first training data set from the set of training data sets. At sub-stage 714, the trajectory planning neural network system processes the first training input and the second training input (and, optionally, the third training input) from the training data set to generate a predicted set of output scores. The trajectory planning neural network system processes the training inputs in accordance with current values of internal parameters of the network. The predicted set of output scores can include a respective score for each location in a set of all possible waypoint locations.

At sub-stage 716, the training system determines an output error using the predicted set of output scores generated by the trajectory planning neural network system and the target output 708. At sub-stage 718, the training system then adjusts the current values of the parameters of the trajectory planning neural network system using the output error. In some implementations, the training system uses machine-learning techniques to train the neural network system, such as stochastic gradient descent with backpropagation. For example, the training system can backpropagate gradients of a loss function that is based on the determined output error to adjust current values of the parameters of the neural network system to optimize the loss function.

After adjusting the current values of the parameters of the trajectory planning neural network system, the training system selects a next training data set from the collection of training data sets and returns to sub-stage 712 to continue the training process using the selected training data set. The training system completes training of the neural network once a training termination condition is satisfied or no further training data sets are available.

To improve the efficacy of training a trajectory planning neural network system, the training system may employ none, one, or more of the following techniques.

In some implementations, the training inputs 704 and/or 706, the training target outputs 708, or both, for one or more training data sets, are derived from records of human-operated vehicles driven by humans in a real-world environment. For example, for a given set of training data, the first training input can characterize waypoint data representing a set of locations traversed by a human-operated vehicle at a series of time steps from 1 through n−1. The training target output 708 for the set of training data can then characterize data representing the location actually traversed by the human-operated vehicle at time step n, i.e., the time step that immediately follows the last time step represented by the waypoint data of the first training input. The location traversed at time step n thus represents a planned target location of the vehicle (i.e., a waypoint at time step n). By using training data that represents actual human driving behaviors, the trajectory planning neural network system can be trained to plan trajectories that mimic trajectories followed by human drivers. Therefore, the trained system may account for similar comfort and safety considerations that would be accounted for by a human driver. Additional training and inference features may also be implemented to minimize the possibility of executing risky driving behaviors that may be represented in some human driving data, and to ensure compliance with applicable legal restriction such as speed limits.

Further, for training data sets that are derived from records of human driving activity, the second or third training inputs 706 can characterize navigation data that represents a planned navigation route that was prescribed for a human driver to follow, and which the human driver was following while driving through the locations indicated by the waypoint data of the first training input, the next location indicated by the training target output, or both. By having a driver follow a prescribed route, that route can then be used to create the navigation data represented in the second or third training inputs 706. In some implementations, the environment data characterized by the second or third training inputs 706 is actual environment data for the vehicle at times when the vehicle drove through one or more of the locations identified by the first training input or the training target output.

In some implementations, the training inputs 704 and/or 706, the training target output 708, or both, of one or more training data sets are derived from results of one or more virtual vehicles driven in a simulated environment. For example, for a given set of training data, the first training input can characterize waypoint data representing a set of locations traversed by a virtual vehicle at a series of time steps from 1 through n−1. The training target output 708 for the set of training data can then characterize data representing the location traversed by the virtual vehicle at time step n, i.e., the time step that immediately follows the last time step represented by the waypoint data of the first training input. The location traversed at time step n thus represents a planned target location of the virtual vehicle (i.e., a waypoint at time step n). Simulated data can sometimes be used to train the trajectory planning neural network system when there is a scarcity of human driving data for particular driving scenarios. For example, in order to train the neural network system to generate appropriate trajectories when faced with an impending collision scenario, simulated training data may be used at least in part (e.g., to supplement real-world driving data) if the quantity of real-world driving data available to generate training data is insufficient.

Further, for training data sets that are derived from results of an automated (virtual) agent driving a virtual vehicle in a simulated environment, the second or third training inputs 706 can characterize navigation data that represents a planned navigation route that was prescribed for the virtual agent to follow, and which was followed by the virtual vehicle while driving through the locations indicated by the waypoint data of the first training input, the next location indicated by the training target output, or both. In some implementations, the environment data characterized by the second or third training inputs 706 represents the simulated environment of the virtual vehicle at times when the vehicle drove through one or more of the locations identified by the first training input 704 or the training target output 708. In other implementations, the environment data represents a real-world environment of a vehicle that corresponds to the simulated environment driven in by the virtual vehicle.

In some implementations, the training system can train the trajectory planning neural network on a collection of training data sets that include some sets derived from records of human-operated vehicles driven in a real-world environment and other sets derived from results of virtual vehicles driven in a simulated environment.

In some implementations, the training system specifically selects training data sets to use in training the trajectory planning neural network system that model particular driving scenarios. For example, to ensure that the neural network system is exposed to a sufficient number of training samples for various high-risk or complex driving scenarios, the training system can select to train the neural network system on at least a minimum quantity of training data sets that model one or more particular driving scenarios. In some implementations, the training system oversamples training data sets that model driving behavior for one or more specified driving scenarios at a greater frequency than the specified driving scenarios occur in the real world. The training data sets can be sampled (e.g., selected) from a pool of candidate training data sets that have been made available to the training system, e.g., training data sets stored in training data repository 604. Examples of driving scenarios that may be emphasized during a training session include lane merges, unprotected left turns, lane changes, impending collisions, and post-collision activity.

In some implementations, the training system may select to train the trajectory planning neural network system on training data sets that model different combinations of sensor channels in the environmental data of the training sets. For example, one of the primary sensing components in many autonomous or semi-autonomous vehicles is LIDAR. The vehicle's driving systems may expect that LIDAR inputs will be available during most normal operation of the vehicle. Nonetheless, on occasion, the LIDAR system may malfunction and at least temporarily drop out of service. Therefore, in order to ensure that the trajectory planning neural network system reacts rationally if a sensor channel drops out of service, the trajectory planning neural network system can be trained on training data sets for which the environmental data characterized by the second or third inputs 706 does not include data representing a sensor channel that is normally expected to be present (e.g., LIDAR). In some implementations, the trajectory planning neural network system can be trained on a first group of training data sets for which the environmental data includes a particular sensor channel, and further on a second group of training data sets for which the environmental data lacks the particular sensor channel.

In some implementations, the training system selects to train the trajectory planning neural network system on a collection of training data sets that model driving behavior that is determined to meet one or more criteria, to the exclusion of other available training data sets that model driving behavior that does not meet such criteria. The criteria for filtering training data sets and distinguishing sets that are acceptable for use in training the neural network system from sets that are not can be based on legal restrictions and other safe-driving policies defined by the training system. As an example, the training system may reject training data sets that model illegal driving behaviors such as exceeding posted speed limits, illegal U-turns, driving the wrong way on a one-way street, reckless driving, etc. Similarly, the training system may reject some training data sets that model driving behaviors that are legal, but that nonetheless violate a safe-driving policy, such as passing on the right or driving at a speed that is too far below a posted speed limit. Notably, in some implementations, legal restrictions and safe-driving policies may also be enforced during the inference phrase with the trained trajectory planning neural network system, e.g., by modifying locations in a planned trajectory for a vehicle to comply with applicable legal restrictions and safe-driving policies. Enforcement during inference can be performed rather than, or in addition to, filtering training data sets during the training phase.

In some implementations, the number of previous vehicle locations represented in the waypoint data characterized by the first training inputs 704 can vary among different training data sets. For example, the first training inputs 704 of a first group of training data sets may each indicate fifteen vehicle locations. However, the first training inputs 704 of a second group of training data sets may each indicate a total of twenty-five previous vehicle locations. By varying the number of vehicle locations in the waypoint data during training, the training system trains the neural network system to determine waypoints in a planned trajectory of a vehicle based on varying numbers of previous vehicle locations indicated in the waypoint data.

Although the training process 700 described with respect to FIG. 7 implied that the current values of parameters of the neural network system were adjusted after processing each training data set, in other implementations the training system trains the neural network system on batches of training data sets. A batch of training data sets can include a collection of related training data sets that represent movements or locations of a particular vehicle at each of a series of consecutive time steps. With batch training, the system may backpropagate gradients of a loss function that is based on the determined output errors from each training data set in the batch to adjust current values of the parameters of the neural network system in a way that optimizes the loss function. In some implementations, batch training allows the training system to optimize a loss function for a full or partial trajectory of a vehicle, rather than for individual locations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for training a trajectory planning neural network, the method comprising:
   obtaining, by a neural network training system, a plurality of training data sets, wherein each training data set includes:
   (i) a first training input that identifies respective locations of a training vehicle along a trajectory of the training vehicle at one or more past time steps,
   (ii) a second training input that characterizes at least one of (a) environmental data that represents an environment of the training vehicle or (b) navigation data that represents a navigation route for the training vehicle, and (iii) a target output that identifies a target location of the training vehicle along the trajectory at a future time step that follows the one or more past time steps, wherein the first training input of at least a first training data set of the plurality of training data sets identifies respective locations of the training vehicle along the trajectory of the training vehicle at multiple past time steps; and training, by the neural network training system in a training phase and using a supervised machine-learning technique, the trajectory planning neural network on the plurality of training data sets, including (i) for each training data set in the plurality of training data sets including the first training data set, processing in a single time step the second training input for the training data set and indications of all of the respective locations of the training vehicle that the first training input for the training data set identifies for the one or more past time steps of the training data set to generate a predicted location of the training vehicle at the future time step of the training data set and (ii) adjusting values of internal parameters of the trajectory planning neural network using an error between predicted locations of the trajectory planning neural network and target outputs of the plurality of training data sets;

wherein, after completion of the training phase, the trajectory planning neural network is enabled to process neural network inputs indicative of past locations of an autonomous or semi-autonomous vehicle to plan a trajectory for the autonomous or semi-autonomous vehicle by predicting locations for the autonomous or semi-autonomous vehicle to travel along the planned trajectory.

2. The method of claim 1, wherein, for each training data set in at least a subset of the plurality of training data sets, the target output of the training data set identifies an actual location of a human-operated vehicle at a time that corresponds to the future time step.

3. The method of claim 2, wherein, for each training data set in at least the subset of the plurality of training data sets, the second training input characterizes navigation data that represents a route that was prescribed for a driver of the human-operated vehicle to follow and that was traversed by the vehicle.

4. The method of claim 3, wherein, for each training data set in at least the subset of the plurality of training data sets, the second training input further characterizes environmental data that represents a current state of the environment of the human-operated vehicle.

5. The method of claim 1, wherein, for each training data set in at least a subset of the plurality of training data sets:

the target output of the training data set identifies a location of a virtual vehicle that was driven in a simulated environment at a time that corresponds to the future time step; and the second training input characterizes navigation data that represents a route that was prescribed for an automated agent of the virtual vehicle to follow while driving in the simulated environment and that was traversed by the virtual vehicle.

6. The method of claim 1, wherein:

for each training data set in at least a first subset of the plurality of training data sets, the target output of the training data set identifies an actual location of a human-operated vehicle at a time that corresponds to the future time step; and for each training data set in at least a second subset of the plurality of training data sets, the target output of the training data set identifies a location of a virtual vehicle that was driven in a simulated environment at another time that corresponds to the future time step.

7. The method of claim 6, further comprising:

identifying that the second subset of the plurality of training data sets models driving behavior for one or more specified driving scenarios; and in response to identifying that the second subset of the plurality of training data sets models behavior for the one or more specified driving scenarios, selecting the second subset of the plurality of training data sets for inclusion in the plurality of training data sets.

8. The method of claim 7, wherein the one or more specified driving scenarios include at least one of a lane merge scenario, an unprotected left turn scenario, a lane change scenario, or a collision scenario.

9. The method of claim 1, wherein obtaining the plurality of training data sets comprises:

selecting a first subset of training data sets with which to train the trajectory planning neural network based on an indication that the second training inputs of the first subset of training data sets characterize environmental data from a first set of sensor channels; and selecting a second subset of training data sets with which to train the trajectory planning neural network based on an indication that the second training inputs of the second subset of training data sets characterize environmental data from a second set of sensor channels, wherein the second set of sensor channels includes at least one sensor channel that is not included in the first set of sensor channels.

10. The method of claim 9, wherein the at least one sensor channel that is included in the second set of sensor channels but not in the first set of sensors channels is a light detection and ranging (LIDAR) sensor channel.

11. The method of claim 1, wherein obtaining the plurality of training data sets comprises:

identifying a plurality of candidate training data sets;

filtering the plurality of candidate training data sets based on one or more criteria; and selecting to train the trajectory planning neural network system on candidate training data sets that satisfy the one or more criteria, to the exclusion of candidate training data sets that do not satisfy the one or more criteria.

12. The method of claim 11, wherein filtering the plurality of candidate training data sets based on the one or more criteria comprises discarding candidate training data sets that model driving behavior that is determined to violate a legal restriction.

13. The method of claim 11, wherein the legal restriction is a speed limit.

14. The method of claim 1, wherein, for each training data set of the plurality of training data sets, the second training input that characterizes at least one of the environmental data or the navigation data was generated by processing at least one of the environmental data or the navigation data using an encoder neural network.

15. The method of claim 1, wherein the neural network training system trains the trajectory planning neural network to generate predictions in the form of a set of output scores, wherein each output score corresponds to a respective location of a set of candidate locations in a vicinity of the autonomous or semi-autonomous vehicle, and a value of each output score indicates a likelihood that the autonomous or semi-autonomous vehicle will travel to the respective location that corresponds to the output score.

16. The method of claim 1, wherein the one or more past time steps of a given training data set include at least one past time step preceding a current time step of the given training data set.

17. The method of claim 16, wherein the one or more past time steps include multiple past time steps preceding the current time step of the given training data set.

18. The method of claim 1, wherein, after completion of the training phase, planning the trajectory for the autonomous or semi-autonomous vehicle comprises storing predicted locations for the trajectory that were predicted by the trajectory planning neural network in an external memory separate from the trajectory planning neural network and predicting additional locations for the trajectory based on previously predicted locations for the trajectory that were stored in the external memory.

19. A training system comprising:
one or more data processing apparatuses; and
one or more non-transitory computer-readable media having instructions stored thereon that, when executed by the one or more data processing apparatuses, cause the one or more data processing apparatuses to perform operations comprising:
  obtaining a plurality of training data sets, wherein each training data set includes:
    (i) a first training input that identifies respective locations of a training vehicle along a trajectory of the training vehicle at one or more past time steps,
    (ii) a second training input that characterizes at least one of (a) environmental data that represents an environment of the training vehicle or (b) navigation data that represents a navigation route for the training vehicle, and
    (iii) a target output that identifies a target location of the training vehicle along the trajectory at a future time step that follows the one or more past time steps,
    wherein the first training input of at least a first training data set of the plurality of training data sets identifies respective locations of the training vehicle along the trajectory of the training vehicle at multiple past time steps; and
  training, in a training phase and using a supervised machine-learning technique, a trajectory planning neural network on the plurality of training data sets, including (i) for each training data set in the plurality of training data sets including the first training data set, processing in a single time step the second training input for the training data set and indications of all of the respective locations of the training vehicle that the first training input for the training data set identifies for the one or more past time steps of the training data set to generate a predicted location of the training vehicle at the future time step of the training data set and (ii) adjusting values of internal parameters of the trajectory planning neural network using an error between predicted locations of the trajectory planning neural network and target outputs of the plurality of training data sets;
  wherein, after completion of the training phase, the trajectory planning neural network is enabled to process neural network inputs indicative of past locations of an autonomous or semi-autonomous vehicle to plan a trajectory for the autonomous or semi-autonomous vehicle by predicting locations for the autonomous or semi-autonomous vehicle to travel along the planned trajectory.

20. One or more non-transitory computer-readable media having instructions stored thereon that, when executed by data processing apparatus, cause the data processing apparatus to perform operations comprising:
  obtaining, by a neural network training system, a plurality of training data sets, wherein each training data set includes:
    (i) a first training input that identifies respective locations of a training vehicle along a trajectory of the training vehicle at one or more past time steps,
    (ii) a second training input that characterizes at least one of (a) environmental data that represents an environment of the training vehicle or (b) navigation data that represents a navigation route for the training vehicle, and
    (iii) a target output that identifies a target location of the training vehicle along the trajectory at a future time step that follows the one or more past time steps,
    wherein the first training input of at least a first training data set of the plurality of training data sets identifies respective locations of the training vehicle along the trajectory of the training vehicle at multiple past time steps; and
  training, by the neural network training system in a training phase and using a supervised machine-learning technique, a trajectory planning neural network on the plurality of training data sets, including (i) for each training data set in the plurality of training data sets including the first training data set, processing in a single time step the second training input for the training data set and indications of all of the respective locations of the training vehicle that the first training input for the training data set identifies for the one or more past time steps of the training data set to generate a predicted location of the training vehicle at the future time step of the training data set and (ii) adjusting values of internal parameters of the trajectory planning neural network using an error between predicted locations of the trajectory planning neural network and target outputs of the plurality of training data sets;
  wherein, after completion of the training phase, the trajectory planning neural network is enabled to process neural network inputs indicative of past locations of an autonomous or semi-autonomous vehicle to plan a trajectory for the autonomous or semi-autonomous vehicle by predicting locations for the autonomous or semi-autonomous vehicle to travel along the planned trajectory.

* * * * *